United States Patent
Watanabe et al.

(10) Patent No.: US 9,341,492 B2
(45) Date of Patent: May 17, 2016

(54) NAVIGATION DEVICE, NAVIGATION METHOD, AND NAVIGATION PROGRAM

(75) Inventors: Keisuke Watanabe, Tokyo (JP); Yuki Furumoto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 76 days.

(21) Appl. No.: 14/130,417

(22) PCT Filed: Nov. 10, 2011

(86) PCT No.: PCT/JP2011/006292
§ 371 (c)(1),
(2), (4) Date: Dec. 31, 2013

(87) PCT Pub. No.: WO2013/069060
PCT Pub. Date: May 16, 2013

(65) Prior Publication Data
US 2014/0156181 A1 Jun. 5, 2014

(51) Int. Cl.
*G01C 21/00* (2006.01)
*G01C 21/36* (2006.01)
*G09B 29/10* (2006.01)
*G08G 1/0968* (2006.01)

(52) U.S. Cl.
CPC ........ *G01C 21/3608* (2013.01); *G01C 21/3632* (2013.01); *G08G 1/096872* (2013.01); *G09B 29/106* (2013.01)

(58) Field of Classification Search
CPC ........... G01C 21/3608; G01C 21/3632; G08G 1/096872; G09B 29/106
See application file for complete search history.

(56) References Cited

U.S. PATENT DOCUMENTS

| | | | | |
|---|---|---|---|---|
| 6,285,924 | B1 * | 9/2001 | Okamoto et al. | 701/1 |
| 6,385,582 | B1 * | 5/2002 | Iwata | 704/270 |
| 7,240,008 | B2 * | 7/2007 | Hitotsumatsu | 704/275 |
| 7,826,945 | B2 * | 11/2010 | Zhang et al. | 701/36 |
| 2002/0010579 | A1 * | 1/2002 | Kitaoka | G01C 21/3608 704/231 |
| 2002/0133353 | A1 * | 9/2002 | Gaitonde et al. | 704/275 |
| 2003/0069686 | A1 * | 4/2003 | Watanabe | G01C 21/20 701/409 |
| 2003/0078727 | A1 | 4/2003 | Komatsu | |
| 2004/0176906 | A1 * | 9/2004 | Matsubara | G01C 21/3608 701/432 |
| 2007/0033043 | A1 * | 2/2007 | Hyakumoto | 704/255 |
| 2007/0055443 | A1 * | 3/2007 | Sumizawa et al. | 701/209 |
| 2007/0106460 | A1 * | 5/2007 | Nakayama et al. | 701/201 |
| 2007/0155404 | A1 * | 7/2007 | Yamane et al. | 455/456.1 |
| 2007/0156331 | A1 * | 7/2007 | Terada | G01C 21/3605 701/532 |

(Continued)

FOREIGN PATENT DOCUMENTS

| | | |
|---|---|---|
| JP | 7-91977 A | 4/1995 |
| JP | 9-206329 A | 8/1997 |

(Continued)

*Primary Examiner* — Calvin Cheung
(74) *Attorney, Agent, or Firm* — Birch, Stewart, Kolasch & Birch, LLP

(57) ABSTRACT

Because a navigation device or method according to the present invention extracts only route guidance expressions which a speaking person, such as a fellow passenger, provides for the driver, interprets the abstract route guidance expressions to determine a concrete route guidance expression, and outputs information to be presented corresponding to the concrete route guidance expression, the navigation device enables the driver to understand the content intuitively and can prevent the driver from mishearing the speaking person's utterance and from driving the vehicle toward a direction which the speaking person does not intend.

19 Claims, 27 Drawing Sheets

(56) References Cited

U.S. PATENT DOCUMENTS

| | | |
|---|---|---|
| 2007/0162222 A1* | 7/2007 | Endo et al. .................... 701/209 |
| 2007/0174006 A1* | 7/2007 | Kusumoto .................... 701/211 |
| 2007/0185644 A1* | 8/2007 | Hirose ......................... 701/200 |
| 2007/0198273 A1* | 8/2007 | Hennecke .................... 704/277 |
| 2007/0244613 A1 | 10/2007 | Ishikawa et al. |
| 2007/0265849 A1* | 11/2007 | Grost et al. .................. 704/257 |
| 2007/0276586 A1* | 11/2007 | Jeon et al. .................... 701/200 |
| 2008/0086260 A1* | 4/2008 | Lee et al. ..................... 701/200 |
| 2008/0221891 A1* | 9/2008 | Konig et al. ................. 704/252 |
| 2009/0234565 A1* | 9/2009 | Geelen ......................... 701/200 |
| 2010/0004850 A1* | 1/2010 | Arita ............................ 701/200 |
| 2010/0153111 A1* | 6/2010 | Hirai et al. ................... 704/251 |
| 2010/0198093 A1* | 8/2010 | Katayama et al. ............ 600/519 |
| 2010/0286901 A1* | 11/2010 | Geelen ...................... G01C 21/34 701/532 |
| 2011/0022302 A1* | 1/2011 | Machino ....................... 701/201 |
| 2011/0257973 A1* | 10/2011 | Chutorash et al. ............ 704/235 |
| 2011/0320114 A1* | 12/2011 | Buxton ................ G01C 21/362 701/439 |
| 2014/0358439 A1* | 12/2014 | Jamain .................. G01C 21/00 701/538 |

FOREIGN PATENT DOCUMENTS

| | | |
|---|---|---|
| JP | 11-51685 A | 2/1999 |
| JP | 2001-133283 A | 5/2001 |
| JP | 2002-221430 A | 8/2002 |
| JP | 2003-121186 A | 4/2003 |
| JP | 2003-329476 A | 11/2003 |
| JP | 2007-302223 A | 11/2007 |
| JP | 2010-145262 A | 7/2010 |
| JP | 2010-204637 A | 9/2010 |

\* cited by examiner

FIG.2

| Directive Word | Landmark | Traveling Direction | |
|---|---|---|---|
| | | Direct Direction | Indirect Direction |
| That | Intersection | Turn Right | Stay On This Road |
| The | Family Restaurant | Right | This Direction |
| Next | Car | Left | ⋮ |
| End | Traffic Light | West | ⋮ |
| 100 Meters Along | ⋮ | ⋮ | ⋮ |
| 200 Meters Along | ⋮ | ⋮ | ⋮ |
| ⋮ | ⋮ | ⋮ | ⋮ |

FIG.3

| Route Guidance Expression | Graphic Expression | Character Expression | Road Color | Road Width |
|---|---|---|---|---|
| Turn Right | Graphic Data About Right Arrow | Character String Data About "Turn Right" | Red | OO Dots |
| To The Right | | | | |
| Toward The Right | | | | |
| Turn Left | Graphic Data About Left Arrow | Character String Data About "Turn Left" | Red | OO Dots |
| To The Left | | | | |
| Toward The Left | | | | |
| Toward The Diagonal Upper Right Direction | Graphic Data About Diagonal Upper Right Arrow | — | Red | OO Dots |
| ⋮ | ⋮ | ⋮ | ⋮ | ⋮ |

FIG.13

| Directive Word | Landmark | Additional Information | Direction |
|---|---|---|---|
| That | Intersection | Red | Turn Right |
| The | Family Restaurant | White | Right |
| Next | Car | Tall | Left |
| End | Traffic Light | Large | West |
| 100 Meters Along | ⋮ | Round | ⋮ |
| 200 Meters Along | ⋮ | ⋮ | ⋮ |
| ⋮ | ⋮ | ⋮ | ⋮ |

FIG.25

| Cancellation/Amendment Expression |
|---|
| I'm wrong |
| I was wrong |
| I've made a mistake |
| Scratch that |
| Stop |
| ⋮ |

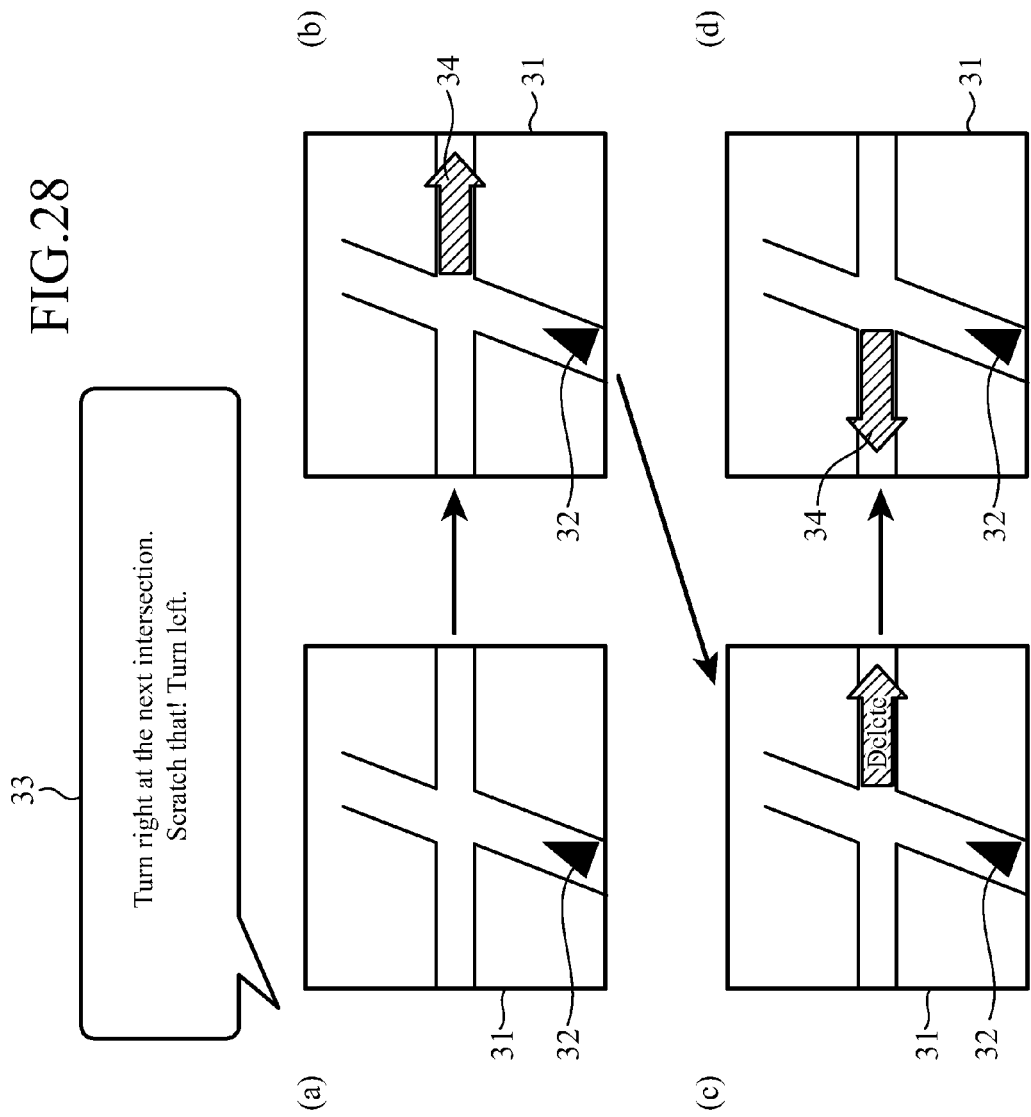

NAVIGATION DEVICE, NAVIGATION METHOD, AND NAVIGATION PROGRAM

FIELD OF THE INVENTION

The present invention relates to a navigation device, a navigation method, and a navigation program capable of recognizing the content of a user's utterance and carrying out navigation.

BACKGROUND OF THE INVENTION

Generally, a navigation device, such as a vehicle-mounted navigation device, provides route guidance for the driver by using a voice output, a graphic display, etc. when the vehicle approaches a predetermined point (e.g., an intersection or the like where the vehicle should change its traveling direction) while travelling along a set route. However, while the navigation device can provide route guidance at a preset certain point, the navigation device cannot present the driver with the content of route guidance which a fellow passenger provides for the driver while the vehicle is travelling as a route guidance content from the navigation device.

A problem is therefore that the driver cannot drive the vehicle according to a fellow passenger's route guidance if he or she mishears the fellow passenger's route guidance or misses the fellow passenger's route guidance due to a surrounding noise. To solve this problem, for example, patent reference 1 describes a voice recognition device that always recognizes a voice and displays the result of the recognition in characters on a screen, just as it is.

RELATED ART DOCUMENT

Patent Reference

Patent reference 1: Japanese Unexamined Patent Application Publication No. 2010-204637

SUMMARY OF THE INVENTION

Problems to be Solved by the Invention

A problem with the conventional navigation device constructed as above is, however, that because the navigation device simply displays the result of carrying out voice recognition in characters on the screen, just as it is, but does not have any function of extracting a route guidance expression from the recognition result and displaying the route guidance expression, there is a possibility that a content which is unrelated to route guidance is also displayed, the content of an utterance is displayed in characters just as it is, and it is therefore difficult for the driver to understand the content intuitively. A further problem is that because the content of an utterance is displayed in characters, just as it is, even if the content of the utterance is abstract and ambiguous, the driver needs to have a troublesome work of interpreting the displayed content as a concrete expression.

The present invention is made in order to solve the above-mentioned problems, and it is therefore an object of the present invention to provide a navigation device, a navigation method, and a navigation program capable of extracting only a route guidance expression which a fellow passenger provides for a driver, interpreting the abstract route guidance expression to determine a concrete content, and presenting the concrete content to the driver in such a way that the driver can easily understand the concrete content intuitively.

Means for Solving the Problem

In order to achieve the above-mentioned object, in accordance with the present invention, there is provided a navigation device that includes a voice acquirer that acquires an inputted voice, a voice recognizer that carries out a voice recognition process on voice data acquired by the above-mentioned voice acquirer, and a position acquirer that acquires a position of a moving object, and that provides route guidance on the basis of the result of the recognition by the above-mentioned voice recognizer, the position of the moving object which is acquired by the above-mentioned position acquirer and map data, the navigation device including: a route guidance expression storage that stores route guidance expressions; a route guidance expression extractor that refers to the above-mentioned route guidance expression storage to extract a route guidance expression from the result of the recognition by the above-mentioned voice recognizer; a route guidance expression interpreter that interprets the route guidance expression extracted by the above-mentioned route guidance expression extractor to determine a concrete route guidance expression; a route guidance expression information to be presented storage that stores visual information to be presented corresponding to the above-mentioned concrete route guidance expression while bringing the visual information to be presented into correspondence with the above-mentioned concrete route guidance expression; a route guidance expression information to be presented retriever that refers to the above-mentioned route guidance expression information to be presented storage to retrieve the corresponding visual information to be presented on the basis of the concrete route guidance expression determined by the above-mentioned route guidance expression interpreter; and a presentation control outputter that outputs the visual information to be presented retrieved by the above-mentioned route guidance expression information to be presented retriever.

Advantages of the Invention

Because the navigation device in accordance with the present invention extracts only route guidance expressions which a speaking person, such as a fellow passenger, provides for the driver, interprets the abstract route guidance expressions to determine a concrete route guidance expression, and outputs information to be presented corresponding to the concrete route guidance expression, the navigation device enables the driver to understand the content intuitively and can prevent the driver from mishearing the speaking person's utterance and from driving the vehicle toward a direction which the speaking person does not intend.

BRIEF DESCRIPTION OF THE FIGURES

FIG. 2 is a diagram showing an example of a route guidance expression storage 3;

FIG. 3 is a diagram showing an example of a route guidance expression information to be presented storage 8 when information to be presented is visual information to be presented;

FIG. 13 is a diagram showing an example of a route guidance expression storage 3 in accordance with Embodiment 4;

FIG. 25 is a diagram showing an example of a cancellation/amendment expression storage 16;

FIG. 28 is a diagram showing an example of a screen transition when an amendment expression is extracted in Embodiment 10.

EMBODIMENTS OF THE INVENTION

Hereafter, the preferred embodiments of the present invention will be explained in detail with reference to the drawings.

Embodiment 1

Figure 1:
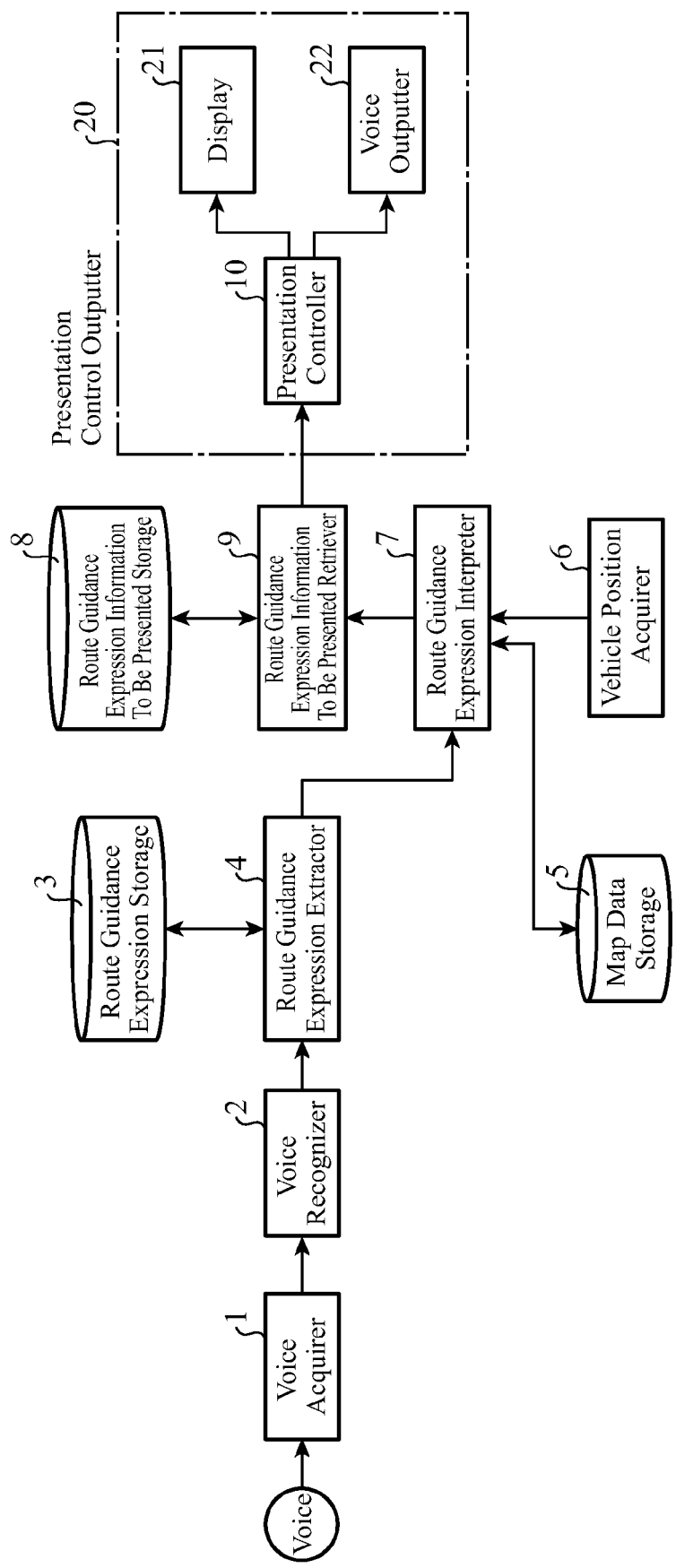
FIG. 1 is a block diagram showing an example of a navigation device in accordance with Embodiment 1.

In accordance with the present invention, there is provided a technique of, in a navigation device that provides route guidance on the basis of map data and the position of a vehicle (moving object), extracting only a route guidance expression which a fellow passenger provides for the driver of the vehicle, interpreting the abstract route guidance expression to determine a concrete content and presenting the concrete content to the driver in such a way that the driver can easily understand the concrete content intuitively. FIG. 1 is a block diagram showing an example of the navigation device in accordance with Embodiment 1 of the present invention. This navigation device is comprised of a voice acquirer 1, a voice recognizer 2, a route guidance expression storage 3, a route guidance expression extractor 4, a map data storage 5, a vehicle position acquirer (position acquirer) 6, a route guidance expression interpreter 7, a route guidance expression information to be presented storage 8, a route guidance expression information to be presented retriever 9, a presentation controller 10, a display 21, and a voice outputter 22. The presentation controller 10, the display 21, and the voice outputter 22 construct a presentation control outputter 20. Further, although not illustrated, this navigation device also includes a key input unit that acquires an input signal from a key, a touch panel, or the like.

The voice acquirer 1 A/D converts a user's utterance collected by a microphone or the like, i.e., an inputted voice to acquire voice data in, for example, a PCM (Pulse Code Modulation) form. The voice recognizer 2 has a recognition dictionary (not shown), detects a voice interval corresponding to a content which a speaking person, such as a fellow passenger, has uttered from the voice data acquired by the voice acquirer 1 to extract a feature quantity, and carries out a voice recognition process using a recognition dictionary on the basis of the feature quantity. The voice recognizer 2 can use a voice recognition server on a network.

The route guidance expression storage 3 typically stores expressions each of which is assumed to be used when a person shows another person the way. FIG. 2 is a diagram showing an example of the route guidance expression storage 3. As shown in this figure, the route guidance expression storage 3 stores route guidance expressions including route guidance expressions each showing a directive word indicating a landmark at a route guidance point where route guidance should be provided, such as "that", "the", "next", "end", "100 meters along", and "200 meters along", route guidance expressions each showing a landmark, such as "intersection", "family restaurant", "car", and "traffic light", direct route guidance expressions each showing a traveling direction, such as "turn right", "right", "left", and "west", and indirect route guidance expressions each showing a traveling direction, such as "stay on this road" and "this direction." The route guidance expression extractor 4 carries out a morphological analysis while referring to the route guidance expression storage 3 to extract route guidance expressions from a character string included in the result of the voice recognition by the voice recognizer 2.

The map data storage 5 stores map data such as road data, intersection data, and facility data. This map data storage 5 can be a storage medium, such as a DVD-ROM, a hard disk, or an SD card, or can be a structural component (map data acquirer) that exists on a network and can acquire information, such as road data, via a communication network. The vehicle position acquirer (position acquirer) 6 acquires the current position (geographic coordinates) and the traveling direction of the vehicle (moving object) by using information acquired from a GPS receiver, a gyroscope, and so on.

The route guidance expression interpreter 7 acquires the route guidance expressions extracted by the route guidance expression extractor 4, and interprets each of the route guidance expressions to determine a concrete route guidance expression. In this Embodiment 1, only route guidance expressions each showing a traveling direction will be explained. For example, when an expression showing a direct direction, such as "turn right" or "to the right", is included in the extracted route guidance expressions, the route guidance expression interpreter interprets that the route guidance expression shows a concrete direction and determines "turn right" or "to the right" as a concrete route guidance expression. In contrast, when an expression showing an indirect direction, such as "stay on this road" or "this direction" is included in the extracted route guidance expressions, the route guidance expression interpreter interprets the expression expressing the indirect direction, which is included in the route guidance expressions, by using both the map data acquired from the map data storage 5 and the position and the traveling direction of the vehicle (moving object) which are acquired from the vehicle position acquirer (position acquirer) 6 to determine a concrete route guidance expression showing a concrete direction. For example, in a situation in which the road bends gradually in a diagonal upper right direction (in a direction of northeast), the route guidance expression interpreter interprets "stay on this road" as traveling in a diagonal upper right direction and determines a concrete route guidance expression which is "toward the diagonal upper right direction."

The route guidance expression information to be presented storage 8 stores the concrete route guidance expression showing the traveling direction, which is determined by the route guidance expression interpreter 7, while bringing this concrete route guidance expression into correspondence with information to be presented (visual information to be presented or auditory information to be presented). When the information to be presented corresponding to the concrete route guidance expression is visual information to be presented, the information to be presented is the one which is provided on a display screen for navigation, a dashboard or the like so that the information is presented visually to the driver. For example, the information to be presented includes a graphic, such as an arrow, pointing to a direction, characters showing a direction, and a road on a map along which the vehicle should travel and which is enhanced with a changed color or a changed roadwidth. FIG. 3 is a diagram showing an example of the route guidance expression information to be presented storage 8 in a case in which the information to be presented is visual information to be presented. As shown in this figure, for example, for concrete route guidance expressions, such as "turn right", "to the right", and "toward the right", graphic data about a right arrow, a character expression (character string data), such as "turn right" or "right", information about the color and the road width of a road on a map from which the vehicle should make a right turn, etc. are stored. In this example shown in FIG. 3, although the same road color and width are set to the case of a right turn, also to the case of a left turn, and to the case of a travel in a diagonal upper right direction, the road color and the road width can be set to be different for each of the route guidance expressions.

Further, although an example of the route guidance expression information to be presented storage 8 in a case in which the information to be presented is auditory information to be presented is not shown, assumed concrete route guidance expressions as shown in FIG. 2 can be stored as voice data (synthesized voices) while voice data about "turn right" (synthesized voice) is stored for the following concrete route guidance expressions: "turn right", "to the right", and "toward the right" and voice data about "turn left" (synthesized voice) is stored for the following concrete route guidance expressions: "turn left", "to the left", and "toward the left." Although corresponding information to be presented is stored only for each concrete route guidance expression showing a traveling direction in the example shown in FIG. 3, voice data (synthesized voices) about all assumed concrete route guidance expressions, such as intersection names and restaurant names, can be additionally stored.

The route guidance expression information to be presented retriever 9 searches through the route guidance expression information to be presented storage 8 by using, as a search key, the concrete route guidance expression determined by the route guidance expression interpreter 7, and retrieves the information to be presented (visual information to be presented or auditory information to be presented) corresponding to a concrete route guidance expression matching the search key. In this embodiment, in the case in which the information to be presented is auditory information to be presented, synthesized voices are generated in advance and are stored in the route guidance expression information to be presented storage 8. As an alternative, the route guidance expression information to be presented retriever 9 can generate a synthesized voice on the basis of voice data stored in the route guidance expression information to be presented storage 8 to retrieve information to be presented. Because a method of generating a synthesized voice from a character string is known, the explanation of this method will be omitted hereafter.

The presentation controller 10 outputs the information to be presented retrieved by the route guidance expression information to be presented retriever 9 to the display 21 or the voice outputter 22 (or to both of them). More specifically, when the information to be presented is visual information to be presented, the presentation controller outputs the information to be presented to the display 21 (e.g., on a display screen for navigation, on a dash boat, or on a windshield), whereas when the information to be presented is auditory information to be presented, the presentation controller outputs the information to be presented to the voice outputter 22 (a speaker or the like).

Figure 4:
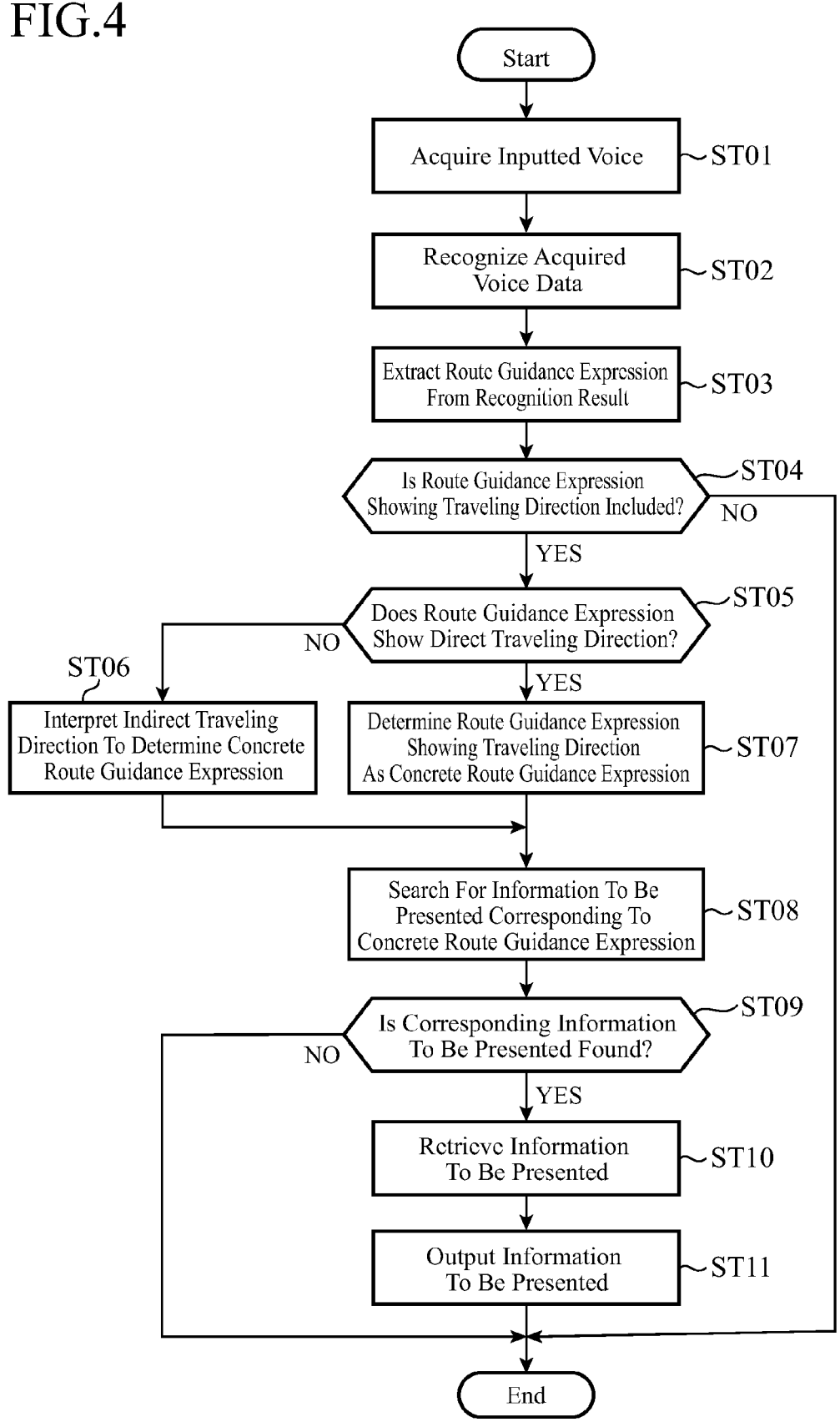
FIG. 4 is a flow chart showing the operation of the navigation device in accordance with Embodiment 1.

Next, the operation of the navigation device in accordance with Embodiment 1 which is constructed as above will be explained. FIG. 4 is a flow chart showing the operation of the navigation device in accordance with Embodiment 1. First, when a certain utterance input is made, the voice acquirer 1 acquires the inputted voice and A/D converts this inputted voice to acquire voice data in, for example, a PCM form (step ST01). Next, the voice recognizer 2 recognizes the voice data acquired by the voice acquirer 1 (step ST02). The route guidance expression extractor 4 then extracts route guidance expressions from the result of the recognition by the voice recognizer 2 while referring to the route guidance expression storage 3 (step ST03). After that, the route guidance expression interpreter 7 interprets the extracted route guidance expressions to determine a concrete route guidance expression (steps ST04 to ST11).

First, the route guidance expression interpreter determines whether or not a route guidance expression showing a traveling direction is included in the route guidance expressions extracted in step ST03 (step ST04). When then determining that no route guidance expression showing a traveling direction is included in the route guidance expressions extracted (when NO in step ST04), the navigation device ends the processing. In contrast, when determining that a route guidance expression showing a traveling direction is included in the route guidance expressions extracted (when YES in step ST04), the route guidance expression interpreter determines whether or not the route guidance expression showing the traveling direction is a one showing a direct traveling direction (step ST05). At this time, when determining that the route guidance expression is a one expressing an indirect traveling direction, such as "stay on this road" (when NO in step ST05), the route guidance expression interpreter interprets which traveling direction is expressed concretely by the route guidance expression on the basis of the route guidance expression "stay on this road", the map data, and the position and the traveling direction of the vehicle (moving object), and determines a concrete route guidance expression (step ST06). In contrast, when, in step ST05, determining that the route guidance expression is a one expressing a direct traveling direction, such as "turn right" (when YES in step ST05), the route guidance expression interpreter determines the route guidance expression showing the direct traveling direction, such as "turn right", as a concrete route guidance expression (step ST07).

After a concrete route guidance expression is determined as mentioned above in step ST06 or ST07, the route guidance expression information to be presented retriever 9 uses the concrete route guidance expression determined by the route guidance expression interpreter 7 as a search key to search through the route guidance expression information to be presented storage 8. The route guidance expression information to be presented retriever then searches for a concrete route guidance expression matching the search key to retrieve the information to be presented (visual information to be presented or auditory information to be presented) corresponding to the concrete route guidance expression (step ST08).

When finding a concrete route guidance expression matching the search key (when YES in step ST09), the route guidance expression information to be presented retriever retrieves the information to be presented (visual information to be presented, auditory information to be presented, or both of them) corresponding to the concrete route guidance expression (step ST10), and the presentation control outputter 20 outputs the information to be presented (outputs the information to be presented using a display output, a voice output, or both of them) (step ST11). In contrast, when not finding a concrete route guidance expression matching the search key (when NO in step ST09), the navigation device ends the processing.

A concrete example will be explained hereafter. For example, when a fellow passenger says "Just stay on this road", the voice acquirer 1 acquires data about the utterance (step ST01), and the voice recognizer 2 provides the result of the recognition of "just stay on this road" (step ST02). The route guidance expression extractor 4 then refers to the route guidance expression storage 3 as shown in FIG. 2 to extract the character string "on this road" as a route guidance expression (step ST03). Then, the route guidance expression interpreter 7 determines that the character string "on this road" is a route guidance expression showing an indirect traveling direction (when YES in step ST04 and NO in step ST05), and interprets this route guidance expression "on this road" as "toward a direction in which the road along which the vehicle is travelling bends" and also interprets which traveling direction is expressed concretely by the route guidance expression on the basis of the map data and the position and the traveling direction of the vehicle (moving object). More specifically, when the road where the vehicle (moving object) is located at that time bends gradually in a diagonal upper right direction (a direction of northeast), and the vehicle is travelling toward the direction, the route guidance expression interpreter determines that "on this road" expresses a concrete route guidance expression "toward the diagonal upper right direction" (step ST06).

Then, the route guidance expression information to be presented retriever searches through the route guidance expression information to be presented storage 8 as shown in FIG. 3 by using the character string "toward the diagonal upper right direction" as the search key (step ST08). Because the route guidance expression information to be presented retriever finds the concrete route guidance expression "toward the diagonal upper right direction" in the table shown in FIG. 3 (when YES in step ST09), the route guidance expression information to be presented retriever retrieves "arrow graphic data about an arrow showing the diagonal right direction" which is visual information to be presented corresponding to the concrete route guidance expression "toward the diagonal upper right direction", voice data about a voice "toward the diagonal upper right direction" which is auditory information to be presented, or voice data about a voice "toward the northeast" (step ST10). Then, when the retrieved information to be presented is visual information to be presented, the navigation device outputs the information on the display screen or the like, whereas when the information to be presented is auditory information to be presented, the navigation device outputs the information from the speaker (step ST11). When retrieving both auditory information to be presented and visual information to be presented, the navigation device generates both a display output and a voice output.

Figure 5:
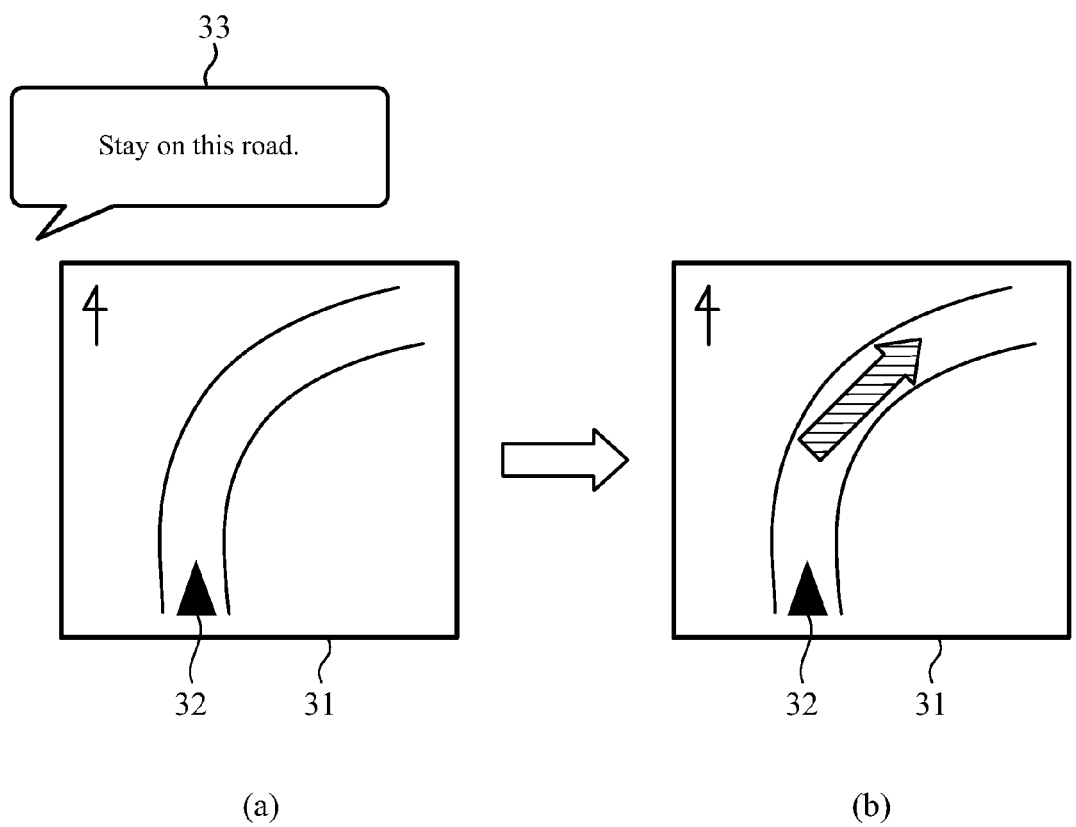
FIG. 5 is a diagram showing an example of a screen of guidance information presented for a user when the information to be presented is visual information to be presented in Embodiment 1.

FIG. 5 is a diagram showing an example of the display screen on which the information to be presented is outputted so as to be presented to the user when the information to be presented is visual information to be presented. FIG. 5(*a*) shows the display screen on which a triangle showing the vehicle 32 is displayed in a navigation screen 31 and a state in which a fellow passenger says "Just stay on this road", and the content of the utterance is shown in a balloon 33. FIG. 5(*b*) shows a state in which, as a result of the navigation device carrying out the processing shown in the flow chart in above-mentioned FIG. 4 in the above-mentioned state, "arrow graphic data about an arrow showing the diagonal right direction" 34 is displayed, as the visual information to be presented, on the same navigation screen 31 as that shown in FIG. 5(*a*).

When the information to be presented is visual information to be presented, if the information to be presented includes, as information to be presented corresponding to a concrete route guidance expression as shown in FIG. 3, character data in addition to the graphic data, the navigation device can also display the character information simultaneously. Further, the user is enabled to set which one of the graphic and character data is to be displayed. Further, although the state in which the arrow is displayed just on the road is shown in FIG. 5(*b*), the display position of the arrow can be arbitrary on the screen. The arrow can be displayed at a fixed display position, or can be displayed at a position where the road is not covered by the arrow. Further, the information to be presented can be displayed on the windshield, instead of on the display screen of the navigation device. In addition, in a case in which the navigation device includes two or more output devices, such as the display screen and the windshield, the navigation device can be constructed in such a way as to further include a presentation device specifying unit and determine which output device should present the information to be presented by using the presentation device specifying unit. Further, the navigation device can display the information to be presented by using a method of making it easy to recognize the information, such as blinking the displayed graphic or characters, moving the displayed graphic or characters from the right to the left, or displaying the displayed graphic or characters while causing the displayed graphic or characters to fade in. In addition, the user is enabled to set which one of the methods is used to display the information to be presented.

Further, the user is enabled to set which one of the following outputting methods of outputting the information to be presented: the method of outputting only visual information to be presented; the method of outputting only auditory information to be presented; and the method of outputting both of them is used. When both visual information to be presented and auditory information to be presented are outputted as the information to be presented, instead of the voice data corresponding to the concrete route guidance expression, a nonlanguage sound urging caution, such as "goon" (a sound effect causing the driver to notice the information), can be outputted as the auditory information to be presented. Further, the navigation device can be constructed in such a way as to, when outputting only visual information to be presented, output auditory information to be presented, such as a nonlanguage sound, in addition to the visual information.

Although the navigation device in accordance with this embodiment always recognizes the content of a fellow passenger's utterance, the navigation device can be alternatively constructed in such a way as to carry out voice recognition only during a predetermined time period (e.g., during a time period during which a fellow passenger is pressing a button for causing the navigation device to carry out voice recognition after starting providing route guidance for the driver). Further, the user is enabled to set whether the navigation device always carries out voice recognition or carries out voice recognition only during a predetermined time period.

As mentioned above, because the navigation device in accordance with this Embodiment 1 can extract only route guidance expressions which are uttered by a speaking person, such as a fellow passenger, interpret the abstract route guidance expressions to determine a concrete route guidance expression, and display the concrete route guidance expression visually with graphic data, such as an arrow, character data, etc., the navigation device makes it easy for the driver to understand the speaking person's utterance intuitively, and can prevent the driver from mishearing the utterance and from driving the vehicle toward a direction which the speaking person does not intend. Further, also when the information to be presented to the driver is not visual information to be presented, but auditory information to be presented, the navigation device can output, by voice, the concrete content which is obtained by interpreting the route guidance expressions uttered by the speaking person, such as a fellow passenger, the navigation device can prevent the driver from mishearing the utterance and from driving the vehicle toward a direction which the speaking person does not intend. In addition, because the navigation device can output both visual information to be presented and auditory information to be presented which correspond to the concrete route guidance expression, the navigation device can prevent the driver from driving the vehicle toward a direction which the speaking person does not intend due to mishearing the utterance more effectively.

Embodiment 2

Figure 6:
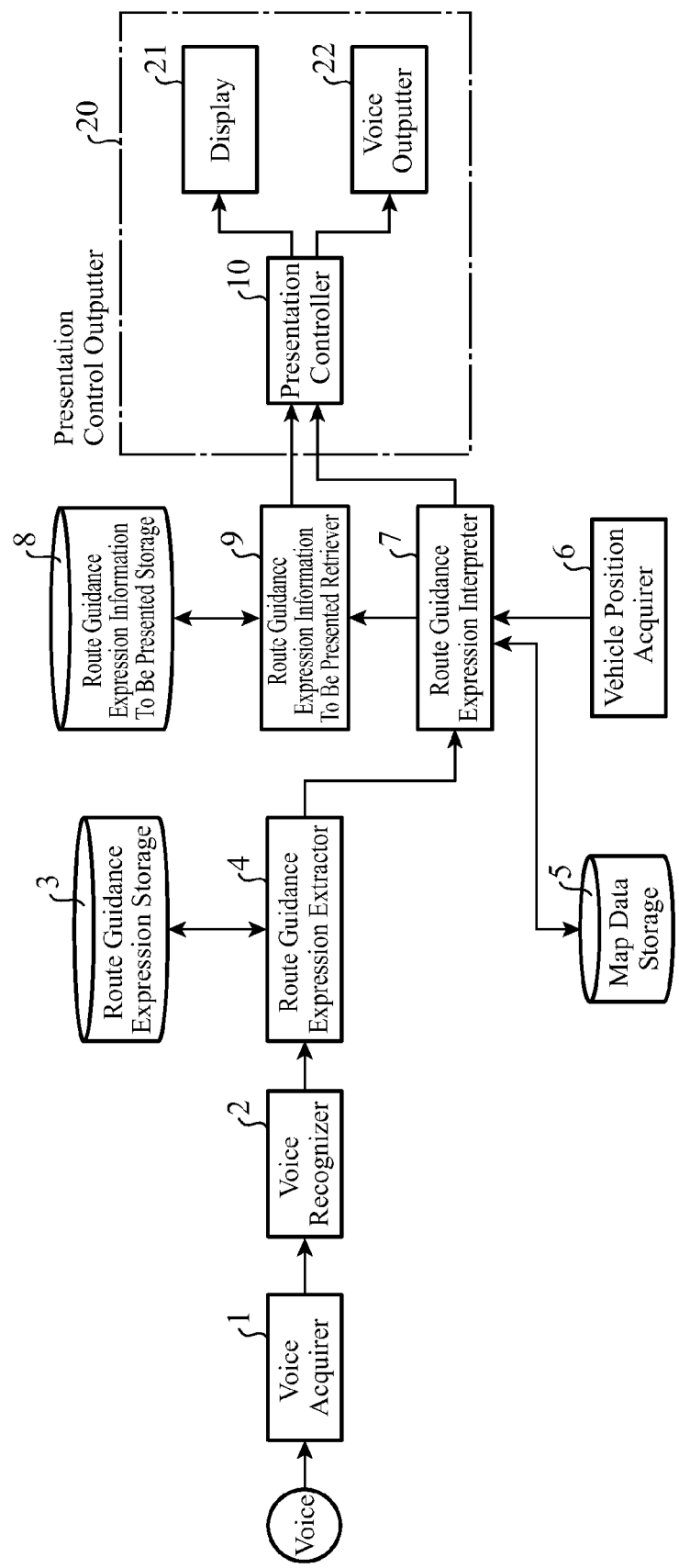
FIG. 6 is a block diagram showing an example of a navigation device in accordance with Embodiment 2.

FIG. 6 is a block diagram showing an example of a navigation device in accordance with Embodiment 2 of the present invention. The same structural components as those explained in Embodiment 1 are designated by the same reference numerals, and the duplicated explanation of the components will be omitted hereafter. In Embodiment 2 shown below, as compared with the navigation device in accordance with Embodiment 1, a route guidance expression interpreter 7 not only determines a concrete route guidance expression, but also outputs the name of a landmark (route guidance point) where the navigation device should provide route guidance to a presentation controller 10, and determines a display position (the position of a route guidance point) when information to be presented is visual information to be presented and outputs the display position to the presentation controller 10.

The route guidance expression interpreter 7 acquires route guidance expressions extracted by a route guidance expression extractor 4, and interprets each of the route guidance expressions to determine a concrete route guidance expression. In this Embodiment 2, not only the determination of a concrete route guidance expression for a route guidance expression expressing a traveling direction, like that explained in Embodiment 1, but also other route guidance expressions will be explained. For example, when a directive word, such as "that", "the", "next", "end", "100 meters along", or "200 meters along", is included in the extracted route guidance expressions, the route guidance expression interpreter interprets the directive word included in the route guidance expressions to determine the name and the position of a landmark or a location (a route guidance point where route guidance should be provided) pointed to by this directive word by using both map data acquired from a map data storage 5 and the position and the traveling direction of a vehicle (moving object) which are acquired from a vehicle position acquirer (position acquirer) 6. For example, the route guidance expression interpreter interprets which intersection is pointed to from route guidance expressions "next" and "intersection" which are extracted by the route guidance expression extractor 4 by using the map data and the position and the traveling direction of the vehicle (moving object), and then determines a concrete route guidance expression "Honcho 1-chome intersection" and the position of this intersection, or interprets which family restaurant is pointed to from route guidance expressions "the" and "family restaurant" by using the map data and the position and the traveling direction of the vehicle (moving object), and then determines a concrete route guidance expression "restaurant 00" and the position of this restaurant. Further, for example, the route guidance expression interpreter interprets a route guidance expression including only a directive word (not including a route guidance expression showing a landmark), such as "end" or "200-meter beyond", by using the map data and the position and the traveling direction of the vehicle (moving object) to determine where the route guidance point is, and determines a concrete route guidance expression "Honcho 1-chome intersection" and the position of this intersection. The route guidance expression interpreter then outputs the concrete route guidance expression to a route guidance expression information to be presented retriever 9, and outputs the position to the presentation controller 10. Further, when, for example, an expression showing a direct direction, such as "turn right" or "to the right", is included in the extracted route guidance expressions, the route guidance expression interpreter interprets the expression as this expression implies to determine the expression, such as "turn right" or "to the right", as a concrete route guidance expression, like the route guidance expression interpreter 7 in accordance with Embodiment 1. In contrast, when an expression showing an indirect direction, such as "stay on this road" or "this direction" is included in the extracted route guidance expressions, the route guidance expression interpreter interprets the route guidance expressions by using both map data acquired from the map data storage 5 and the position and the traveling direction of the vehicle (moving object) which are acquired from the vehicle position acquirer (position acquirer) 6 to determine a concrete route guidance expression showing a concrete direction. For example, in a situation in which the road bends gradually in a diagonal upper right direction (in the northeast), the route guidance expression interpreter interprets "stay on this road" as travelling in a diagonal upper right direction and determines a concrete route guidance expression which is "toward the diagonal upper right direction."

A diagram showing an example of a route guidance expression information to be presented storage 8 when the information to be presented is visual information to be presented is the same as FIG. 3 shown in Embodiment 1. Although corresponding information to be presented is stored only for each concrete route guidance expression showing a traveling direction in the example shown in FIG. 3. In this Embodiment 2, voice data (synthesized voices) can be stored for all assumed concrete route guidance expressions, such as intersection names and restaurant names, as well as for concrete route guidance expressions, as shown in FIG. 3, each showing a traveling direction.

When the presentation controller 10 outputs the information to be presented retrieved by the route guidance expression information to be presented retriever 9 to a display 21 or a voice outputter 22 (or to both of them), and the information to be presented is visual information to be presented, the presentation controller displays the information to be presented at the position of the route guidance point determined by the route guidance expression interpreter 7.

Figure 7:
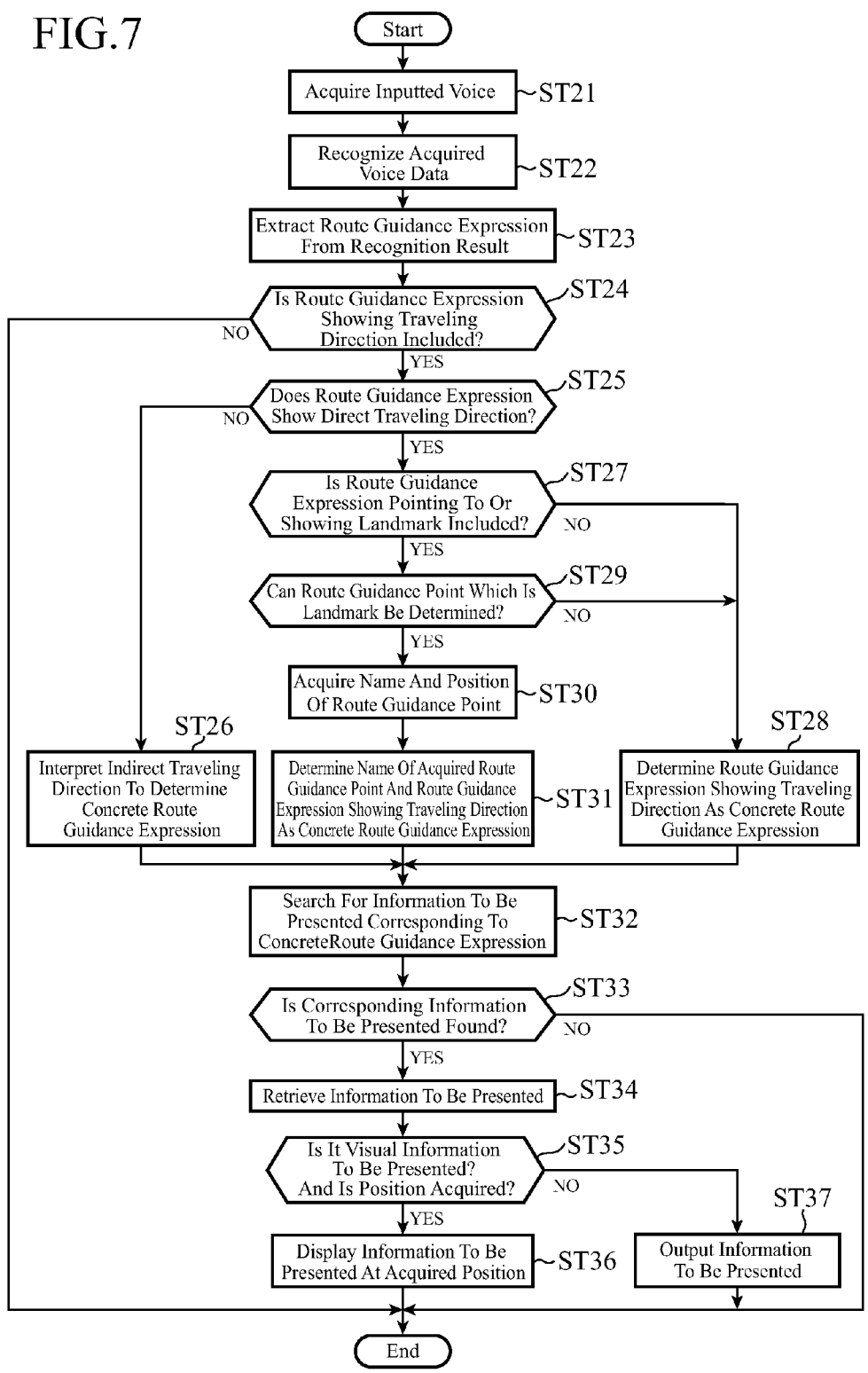
FIG. 7 is a flow chart showing the operation of the navigation device in accordance with Embodiment 2.

Next, the operation of the navigation device in accordance with Embodiment 2 constructed as above will be explained. FIG. 7 is a flow chart showing the operation of the navigation device in accordance with Embodiment 2. Because processes in steps ST21 to ST26 are the same as those in steps ST01 to ST06 of the flow chart shown in FIG. 4 shown in Embodiment 1, the explanation of the processes will be omitted hereafter. When a route guidance expression shows a direct traveling direction, such as "turn right", in this Embodiment 2 in step ST25 (when YES in step ST25), the navigation device further determines whether or not a route guidance expression pointing to or showing a landmark is included (step ST27). When determining that no route guidance expression pointing to or showing a landmark is included (when NO in step ST27), the navigation device determines the route guidance expression showing the direct traveling direction "turn right" as a concrete route guidance expression (step ST28). Subsequent processes in steps ST32 to ST37 will be mentioned below.

In contrast, when a route guidance expression pointing to a landmark, such as "next", or a route guidance expression showing a landmark, such as "intersection", is included (when YES in step ST27), the navigation device further determines whether or not to be able to determine the route guidance point which is the landmark from the route guidance expression pointing to or showing the landmark (step ST29). When a route guidance expression showing a landmark, such as "intersection", is included, the navigation device can determine the route guidance point which is the landmark on the basis of the route guidance expressions "next" and "intersection", map data, and the position and the traveling direction of the vehicle (moving object). In contrast, even when no route guidance expression showing a landmark is included, from a route guidance expression including only a directive word, such as "end" or "200-meter beyond", the navigation device can determine a route guidance point pointed to by the directive word on the basis of map data, and the position and the traveling direction of the vehicle (moving object). When being able to determine the route guidance point which is the landmark this way (when YES in step ST29), the navigation device acquires the name and the position of the route guidance point (step ST30). The navigation device then determines both the name of the acquired route guidance point and the route guidance expression which is, in step ST25, determined to be a route guidance expression showing a direct traveling direction as a concrete route guidance expression (step ST31). Subsequent processes in steps ST32 to ST37 will be mentioned below.

In contrast, when, in step ST29, being unable to determine any route guidance point (when NO in step ST29), the navigation device determines the route guidance expression which is, in step ST25, determined to be a route guidance expression showing a direct traveling direction as a concrete route guidance expression (step ST28). Subsequent processes in steps ST32 to ST37 will be shown below.

After a concrete route guidance expression is determined in step ST26, ST28, or ST31 the above-mentioned way, the route guidance expression information to be presented retriever 9 uses, as a search key, the concrete route guidance expression determined by the route guidance expression interpreter 7 to search through the route guidance expression information to be presented storage 8 for a concrete route guidance expression matching the search key, and then retrieves information to be presented (visual information to be presented or auditory information to be presented) corresponding to the concrete route guidance expression (step ST32).

When then finding a concrete route guidance expression matching the search key (when YES in step ST33), the route guidance expression information to be presented retriever retrieves the information to be presented (visual information to be presented, auditory information to be presented, or both of them) corresponding to the concrete route guidance expression (step ST34). Further, when the retrieved information to be presented is visual information to be presented and the position of the route guidance point is acquired in step ST30 (when YES in step ST35), a presentation control outputter 20 displays the visual information to be presented at the acquired position (step ST36). In contrast, when the information to be presented retrieved in step ST35 is auditory information to be presented or when the navigation device does not pass through the process of acquiring the position of the route guidance point in step ST30, the presentation control outputter outputs the information to be presented retrieved in step ST34 (outputs the information to be presented using a display output, a voice output, or both of them) (step ST37). In contrast, when not finding a concrete route guidance expression matching the search key (when NO in step ST33), the navigation device ends the processing.

A concrete example will be explained hereafter. For example, when a fellow passenger says "Turn right at the next intersection", a voice acquirer 1 acquires voice data about the utterance (step ST21), and a voice recognizer 2 acquires the result of recognition of "turn right at the next intersection" (step ST22). A route guidance expression extractor 4 then extracts the following character strings "turn right", "next", and "intersection" as route guidance expressions by referring to a route guidance expression storage 3 as shown in FIG. 2 (step ST23). After that, the route guidance expression interpreter 7 determines that the character string "turn right" is a route guidance expression showing a direct traveling direction (when YES in step ST24 and YES in step ST25), and further determines whether or not a route guidance expression pointing to a landmark is included (step ST27). In this case, because the route guidance expression "next" pointing to a landmark and the route guidance expression "intersection" showing a landmark are included (when YES in step ST27), and the navigation device can determine which intersection is expressed concretely by the route guidance expressions to determine a route guidance point on the basis of both the route guidance expression "next" and the route guidance expression "intersection", map data, and the position and the traveling direction of the vehicle (moving object) (when YES in step ST29), the navigation device interprets the route guidance expressions and determines the route guidance point. More specifically, the navigation device interprets that the route guidance point signified by "next" and "intersection" is "Honcho 1-chome intersection", and acquires the name "Honcho 1-chome intersection" and the position of this intersection (step ST30). The navigation device then determines the name "Honcho 1-chome intersection" of the acquired route guidance point and the route guidance expression "turn right" showing the traveling direction as a concrete route guidance expression (step ST31).

After that, the navigation device uses the character string "turn right" as a search key to search through the route guidance expression information to be presented storage 8 as shown in FIG. 3 (step ST32). Because the navigation device then finds a concrete route guidance expression "turn right" in the route guidance expression information to be presented storage (when YES in step ST33), the navigation device retrieves "graphic data about a right arrow" which is visual information to be presented corresponding to the concrete route guidance expression "turn right", "character data about "turn right"," and "voice data about "turn right"" which is auditory information to be presented. Further, when voice data corresponding to the intersection name "Honcho 1-chome intersection" is stored in the route guidance expression information to be presented storage 8, the navigation device can also acquire the voice data (step ST34). Because the navigation device also, in step ST30, acquires the position of "Honcho 1-chome intersection" which is the route guidance point when the retrieved information to be presented is visual information to be presented (when YES in step ST35), the navigation device outputs the "graphic data about a right arrow" and the "character data about "turn right"" which are visual information to be presented at the position of "Honcho 1-chome intersection" on a display screen (step ST36). Further, when the information to be presented is auditory information to be presented, the navigation device outputs the voice data from a speaker (step ST37). When retrieving both auditory information to be presented and visual information to be presented, the navigation device generates both a display output and a voice output.

Figure 8:
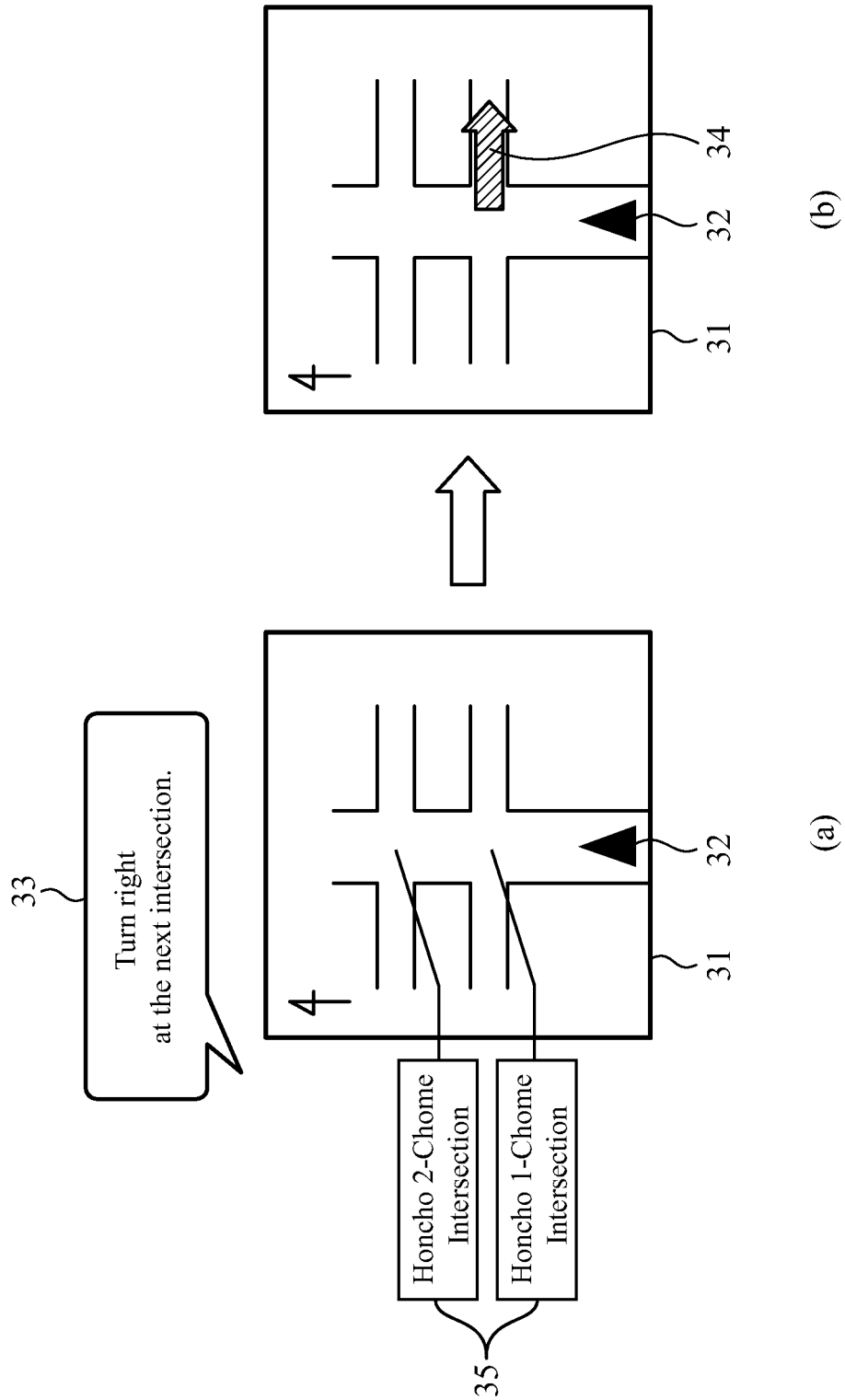
FIG. 8 is a diagram showing an example of a screen of guidance information presented for a user when the information to be presented is visual information to be presented in Embodiment 2.

FIG. 8 is a diagram showing an example of the display screen on which the information to be presented is outputted so as to be presented to the user when the information to be presented is visual information to be presented. FIG. 8(a) shows the display screen on which a triangle showing the vehicle 32 is displayed in a navigation screen 31 and a state in which a fellow passenger says "Turn right at the next intersection", and the content of the utterance is shown in a balloon 33. Two intersection names 35 shown in the figure are "Honcho 1-chome intersection" and "Honcho 2-chome intersection" from the bottom. FIG. 8(b) shows a state in which, as a result of the navigation device carrying out a process in the flow chart shown in above-mentioned FIG. 7 when the two intersections are displayed, the "graphic data about a right arrow" 34 is displayed at the position of "Honcho 1-chome intersection", as visual information to be presented, on the same navigation screen 31 as that shown in FIG. 8(a).

Figure 9:
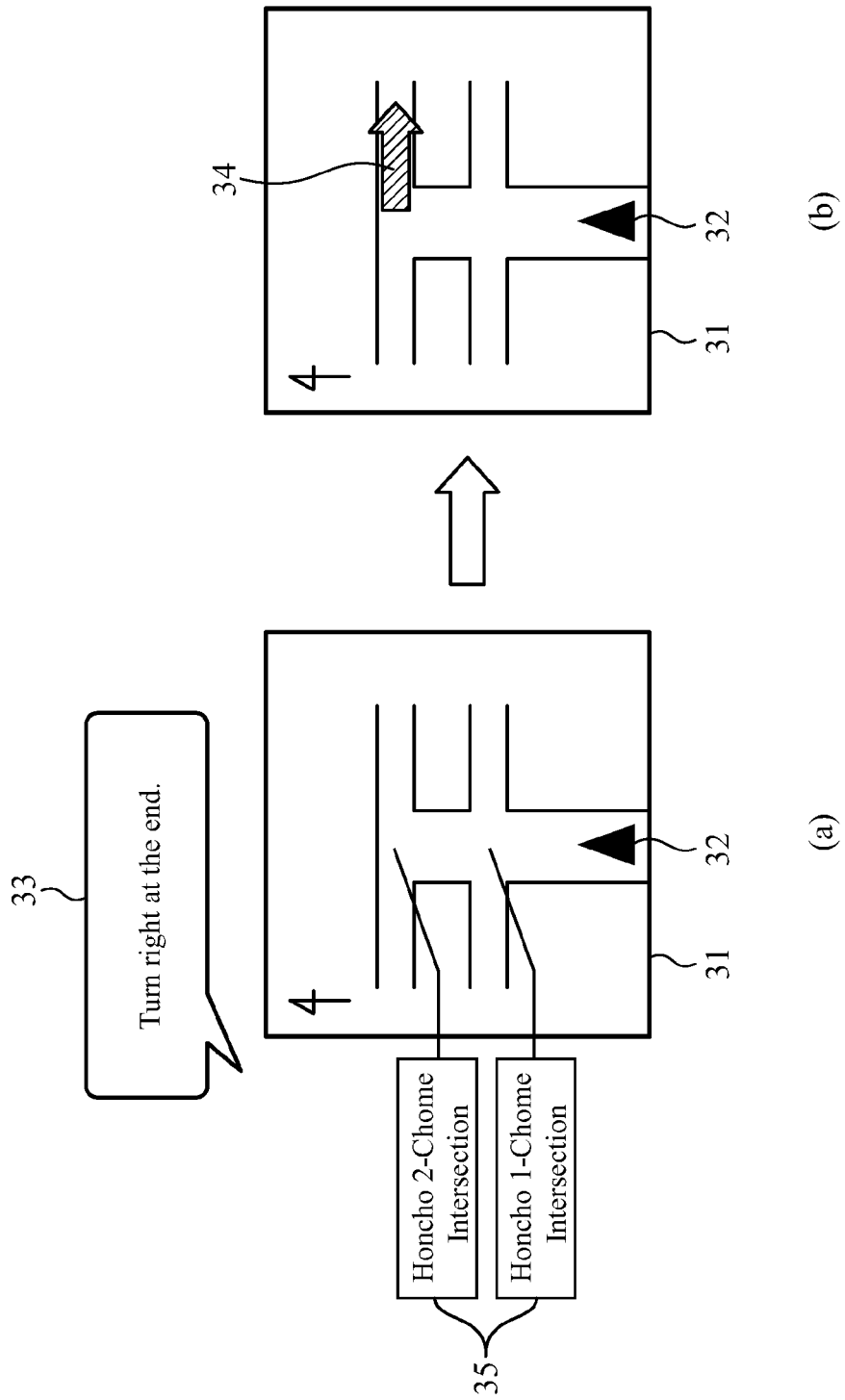
FIG. 9 is a diagram showing another example of the screen of guidance information presented for a user when the information to be presented is visual information to be presented in Embodiment 2.

Further, FIG. 9 is a diagram showing another example of the display screen which the information to be presented is outputted so as to be presented to the user when the information to be presented is visual information to be presented. FIG. 9(a) shows the display screen on which the triangle showing the vehicle 32 is displayed in the navigation screen 31 and a state in which a fellow passenger says "Turn right at the end", and the content of the utterance is shown in the balloon 33. The two intersection names 35 shown in the figure are "Honcho 1-chome intersection" and "Honcho 2-chome intersection" from the bottom. FIG. 9(b) shows a state in which, as a result of the navigation device carrying out the process in the flow chart shown in above-mentioned FIG. 7 when the two intersections are displayed, the "graphic data about a right arrow" 34 is displayed at the position of "Honcho 2-chome intersection", as visual information to be presented, on the same navigation screen 31 as that shown in FIG. 9(a).

When the information to be presented is visual information to be presented, if the information to be presented includes, as information to be presented corresponding to a concrete route guidance expression as shown in FIG. 3, character data in addition to the graphic data, the navigation device can also display the character information simultaneously. Further, the user is enabled to set which one of the graphic and character data is to be displayed. In addition, the name of the determined route guidance point can also be displayed. Further, when the navigation device does not pass through the process of acquiring the position of the route guidance point in step ST30 even though the information to be presented is visual information to be presented, the information to be presented can be displayed at any position on the screen. The information to be presented can be displayed at a fixed display position, or can be displayed at a position where the road is not covered by the information. Further, the information to be presented can be displayed on a windshield, instead of on the display screen of the navigation device. In addition, in a case in which the navigation device includes two or more output devices, such as the display screen and the windshield, the navigation device can be constructed in such a way as to further include a presentation device specifying unit and determine which output device should present the information to be presented by using the presentation device specifying unit. Further, the navigation device can display the information to be presented by using a method of making it easy to recognize the information, such as blinking the displayed graphic or characters, moving the displayed graphic or characters from the right to the left, or displaying the displayed graphic or characters while causing the displayed graphic or characters to fade in. Further, the user is enabled to set which one of the methods is used to display the information to be presented.

Further, the user is enabled to set which one of the following outputting methods of outputting the information to be presented: the method of outputting only visual information to be presented; the method of outputting only auditory information to be presented; and a method of outputting both of them is used. When both visual information to be presented and auditory information to be presented are outputted as the information to be presented, instead of the voice data corresponding to the concrete route guidance expression, a non-language sound urging caution, such as "goon" (a sound effect causing the driver to notice the information), can be outputted as the auditory information to be presented. Further, the navigation device can be constructed in such a way as to, when outputting only visual information to be presented, output auditory information to be presented, such as a non-language sound, in addition to the visual information. Further, when outputting only auditory information to be presented, the navigation device can consecutively output voice data about both the name of the route guidance point and the concrete traveling direction which are determined by the route guidance expression interpreter 7, such as "Honcho 1-chome intersection and turn right."

Although the navigation device in accordance with this embodiment always recognizes the content of a fellow passenger's utterance, the navigation device can be alternatively constructed in such a way as to carry out voice recognition only during a predetermined time period (e.g., during a time period during which a fellow passenger is pressing a button for causing the navigation device to carry out voice recognition after starting providing route guidance for the driver). Further, the user is enabled to set whether the navigation device always carries out voice recognition or carries out voice recognition only during a predetermined time period.

As mentioned above, because the navigation device in accordance with this Embodiment 2 can extract only route guidance expressions which are uttered by a speaking person, such as a fellow passenger, interpret the abstract route guidance expressions to determine a concrete route guidance expression, and display the concrete route guidance expression visually with graphic data, such as an arrow, character data, etc., the navigation device makes it easy for the driver to understand the speaking person's utterance intuitively, and can prevent the driver from mishearing the utterance and from driving the vehicle toward a direction which the speaking person does not intend. Further, also when the information to be presented to the driver is not visual information to be presented, but auditory information to be presented, the navigation device can output, by voice, the concrete content which is obtained by interpreting the route guidance expression uttered by the speaking person, such as a fellow passenger, together with the name of a route guidance point, the navigation device can prevent the driver from mishearing the utterance and from driving the vehicle toward a direction which the speaking person does not intend. In addition, because the navigation device can output both visual information to be presented and auditory information to be presented which correspond to the concrete route guidance expression, the navigation device can prevent the driver from driving the vehicle toward a direction which the speaking person does not intend due to mishearing the utterance more effectively.

Embodiment 3

Because a block diagram showing a navigation device in accordance with Embodiment 3 of the present invention is the same as that shown in FIG. 6 shown in Embodiment 2, the illustration and the explanation of the block diagram will be omitted. The navigation device in accordance with Embodiment 3 shown below determines a landmark pointed to by a directive word included in a route guidance expression in consideration of route information currently being set in the navigation device in accordance with Embodiment 2.

Figure 10:
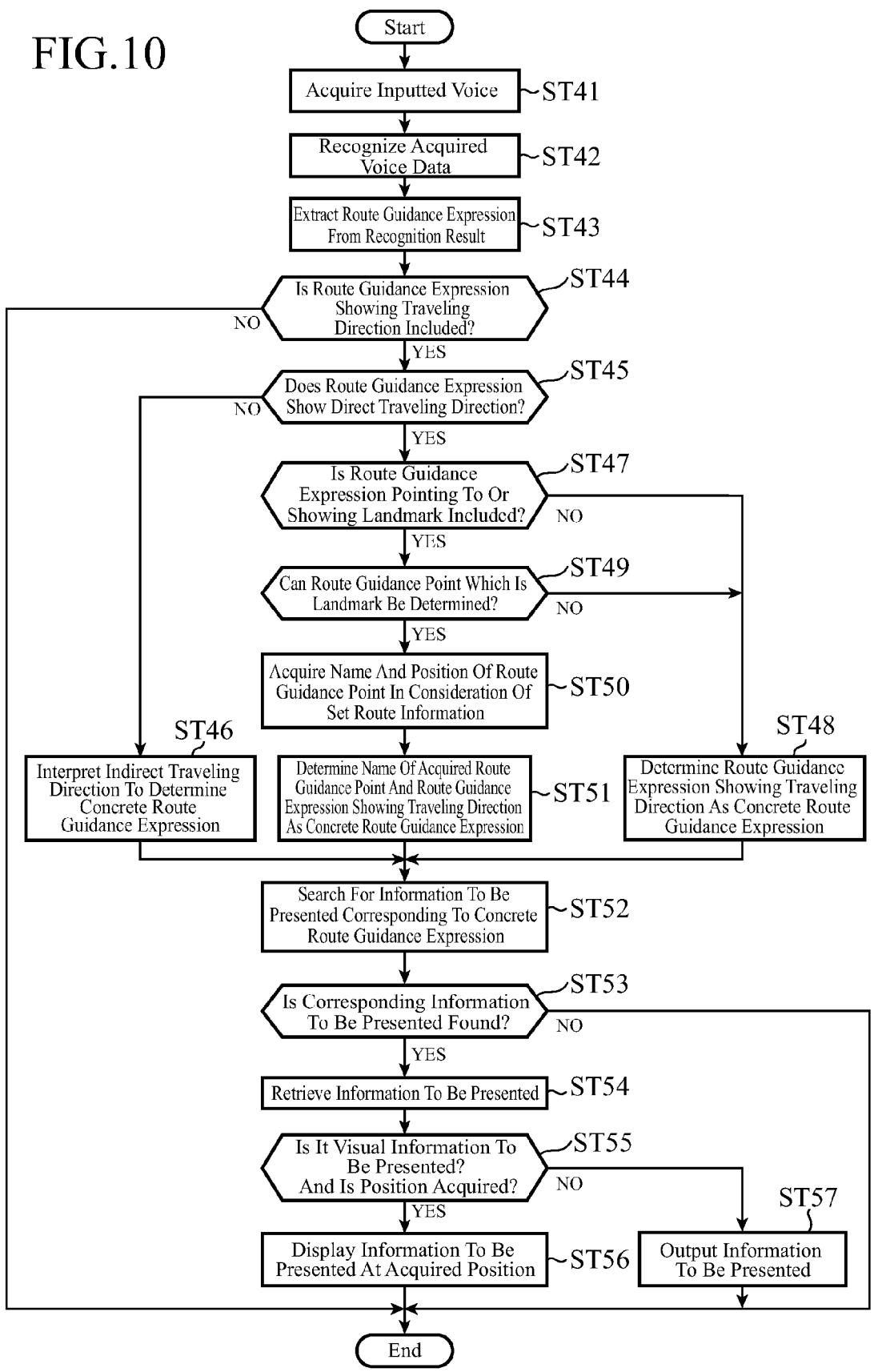
FIG. 10 is a flow chart showing the operation of the navigation device in accordance with Embodiment 3.

FIG. 10 is a flow chart showing the operation of the navigation device in accordance with Embodiment 3. Because processes in steps ST41 to ST49 and ST51 to ST57 other than step ST50 of this flow chart are the same as those in steps ST21 to ST29 and ST31 to ST37 of the flow chart of FIG. 7 shown in Embodiment 2, the explanation of the processes will be omitted hereafter.

In this Embodiment 3, because when a route guidance expression pointing to or showing a landmark, such as "next" or "intersection", is included in step ST47 (when YES in step ST47), the navigation device can determine which intersection is expressed concretely by the route guidance expression to determine a route guidance point on the basis of the route guidance expression, such as "next" or "intersection", map data, and the position and the traveling direction of the vehicle (moving object) (when YES in step ST49), the navigation device interprets the route guidance expression and determines the route guidance point. At this time, the navigation device also takes into consideration the route information about the route currently being set to acquire the name and the position of the route guidance point (step ST50). In contrast, when, in step ST49, being unable to determine any route guidance point (when NO in step ST49), the navigation device determines the route guidance expression which is, in step ST45, determined to be a route guidance expression showing a direct traveling direction as a concrete route guidance expression (step ST48).

Figure 11:
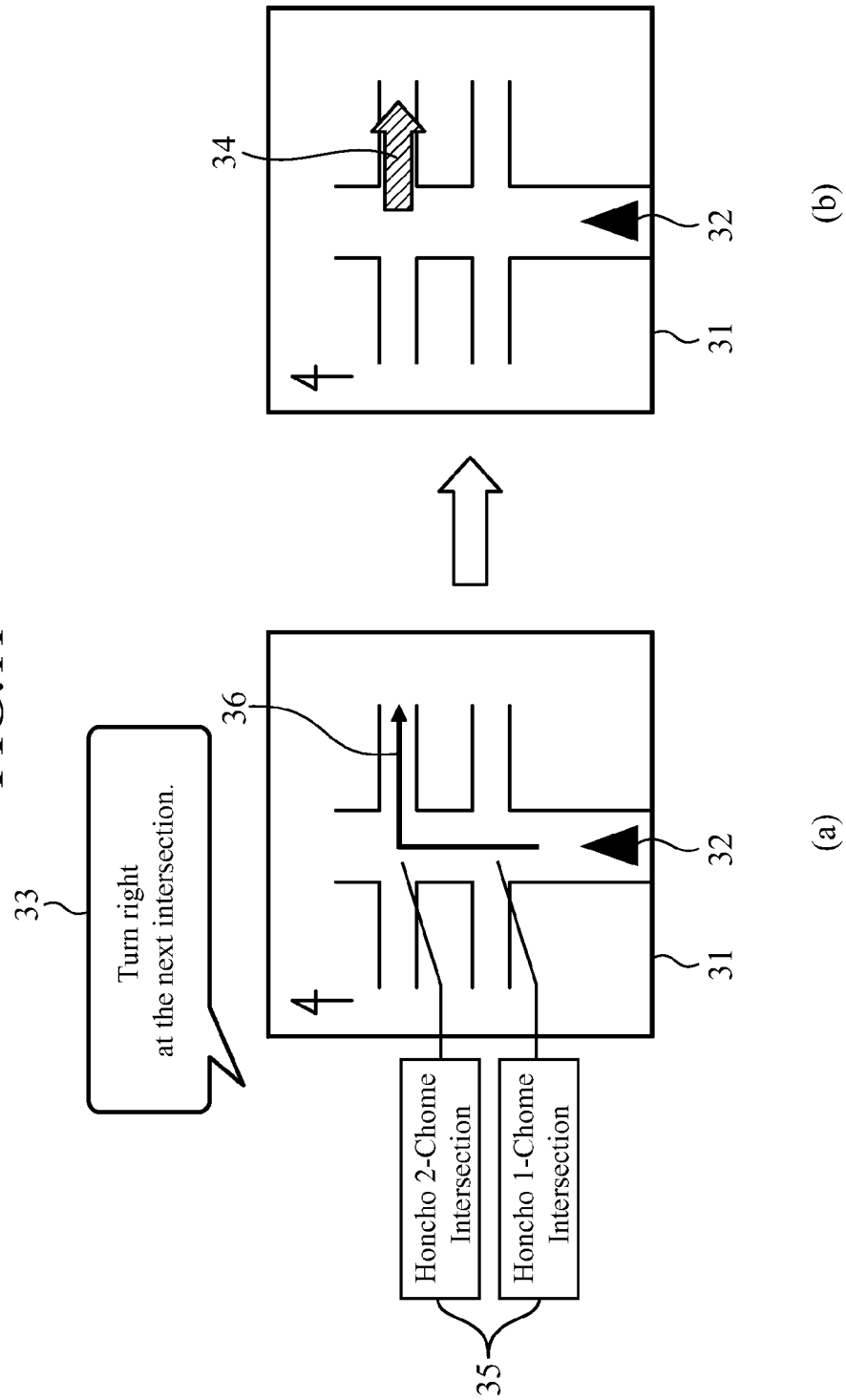
FIG. 11 is a diagram showing an example of a screen of guidance information presented for a user when the information to be presented is visual information to be presented and a route guidance expression showing a location is included in the route guidance expression in Embodiment 3.

As a concrete example, a case in which a fellow passenger says "Turn right at the next intersection" will be explained with reference to FIG. 11. FIG. 11 is a diagram showing an example of a display screen on which the information to be presented is outputted to be presented to the user when the information to be presented is visual information to be presented and a route guidance expression showing a location is included in the route guidance expressions. FIG. 11(a) is the same diagram as FIG. 8(a), and shows the display screen on which a triangle showing a vehicle 32 is displayed in a navigation screen 31 and a state in which a fellow passenger says "Turn right at the next intersection", and the content of the utterance is shown in a balloon 33. Two intersection names 35 shown in the figure are "Honcho 1-chome intersection" and "Honcho 2-chome intersection" from the bottom, and an arrow 36 shows a set route at this time. FIG. 11(b) shows a state in which, as a result of the navigation device carrying out a process in the flowchart shown in above-mentioned FIG. 10 when the two intersections are displayed, "graphic data about a right arrow" 34 is displayed at the position of "Honcho 2-chome intersection", as visual information to be presented, on the same navigation screen 31 as that shown in FIG. 11(a) by also taking the set route into consideration.

More specifically, when acquiring expressions "next" and "OO" (e.g., "intersection"), the route guidance expression interpreter 7 in accordance with Embodiment 2 interprets that they point to "OO" (intersection) which is the nearest to the vehicle (moving object) when the vehicle (moving object) turns toward the traveling direction from the current position of the vehicle (moving object), while a route guidance expression interpreter in accordance with this Embodiment 3 interprets that they are "next" and "OO" (intersection) showing a route guidance point on the route. As a result, even in a case in which some "OOs" (intersections) exist contiguously at short distances from the current position, the route guidance expression interpreter 7 can correctly determine "OO" (intersection) pointed to by "next" as "Honcho 2-chome intersection."

When the information to be presented is visual information to be presented, if the information to be presented includes, as information to be presented corresponding to a concrete route guidance expression as shown in FIG. 3, character data in addition to the graphic data, the navigation device can also display the character information simultaneously. Further, the user is enabled to set which one of the graphic and character data is to be displayed. In addition, the name of the determined route guidance point can also be displayed. Further, when the navigation device does not pass through the process of acquiring the position of the route guidance point in step ST50 even though the information to be presented is visual information to be presented, the information to be presented can be displayed at any position on the screen. The information to be presented can be displayed at a fixed display position, or can be displayed at a position where the road is not covered by the information. Further, the information to be presented can be displayed on a windshield, instead of on the display screen of the navigation device. In addition, in a case in which the navigation device includes two or more output devices, such as the display screen and the windshield, the navigation device can be constructed in such a way as to further include a presentation device specifying unit and determine which output device should present the information to be presented by using the presentation device specifying unit. Further, the navigation device can display the information to be presented by using a method of making it easy to recognize the information, such as blinking the displayed graphic or characters, moving the displayed graphic or characters from the right to the left, or displaying the displayed graphic or characters while causing the displayed graphic or characters to fade in. In addition, the user is enabled to set which one of the methods is used to display the information to be presented.

Further, the user is enabled to set which one of the following outputting methods of outputting the information to be presented: the method of outputting only the visual information to be presented; the method of outputting only the auditory information to be presented; and the method of outputting both of them is used. When both visual information to be presented and auditory information to be presented are outputted as the information to be presented, instead of the voice data corresponding to the concrete route guidance expression, a non-language sound urging caution, such as "goon" (a sound effect causing the driver to notice the information), can be outputted as the auditory information to be presented. In addition, the navigation device can be constructed in such a way as to, when outputting only visual information to be presented, output auditory information to be presented, such as a non-language sound, in addition to the visual information. Further, when outputting only auditory information to be presented, the navigation device can consecutively output voice data about both the name of the route guidance point and the concrete traveling direction which are determined by the route guidance expression interpreter 7, such as "Turn right at Honcho 2-chome intersection."

Also in this embodiment, although the navigation device always recognizes the content of a fellow passenger's utterance, the navigation device can be alternatively constructed in such a way as to carry out voice recognition only during a predetermined time period (e.g., during a time period during which a fellow passenger is pressing a button for causing the navigation device to carry out voice recognition after starting providing route guidance for the driver). Further, the user is enabled to set whether the navigation device always carries out voice recognition or carries out voice recognition only during a predetermined time period. In addition, the user is enabled to set whether or not to use the function of taking into consideration the set route information in accordance with this Embodiment 3.

As mentioned above, because the navigation device in accordance with this Embodiment 3 can determine and display the position of a concrete route guidance point from a point shown by an abstract route guidance expression which is uttered by a speaking person, such as a fellow passenger, more correctly, in addition to providing the same effects as those provided by Embodiment 2, the navigation device can prevent the driver from mishearing and misunderstanding the utterance, and from driving the vehicle toward a direction which the speaking person does not intend more effectively.

Embodiment 4

Figure 12:
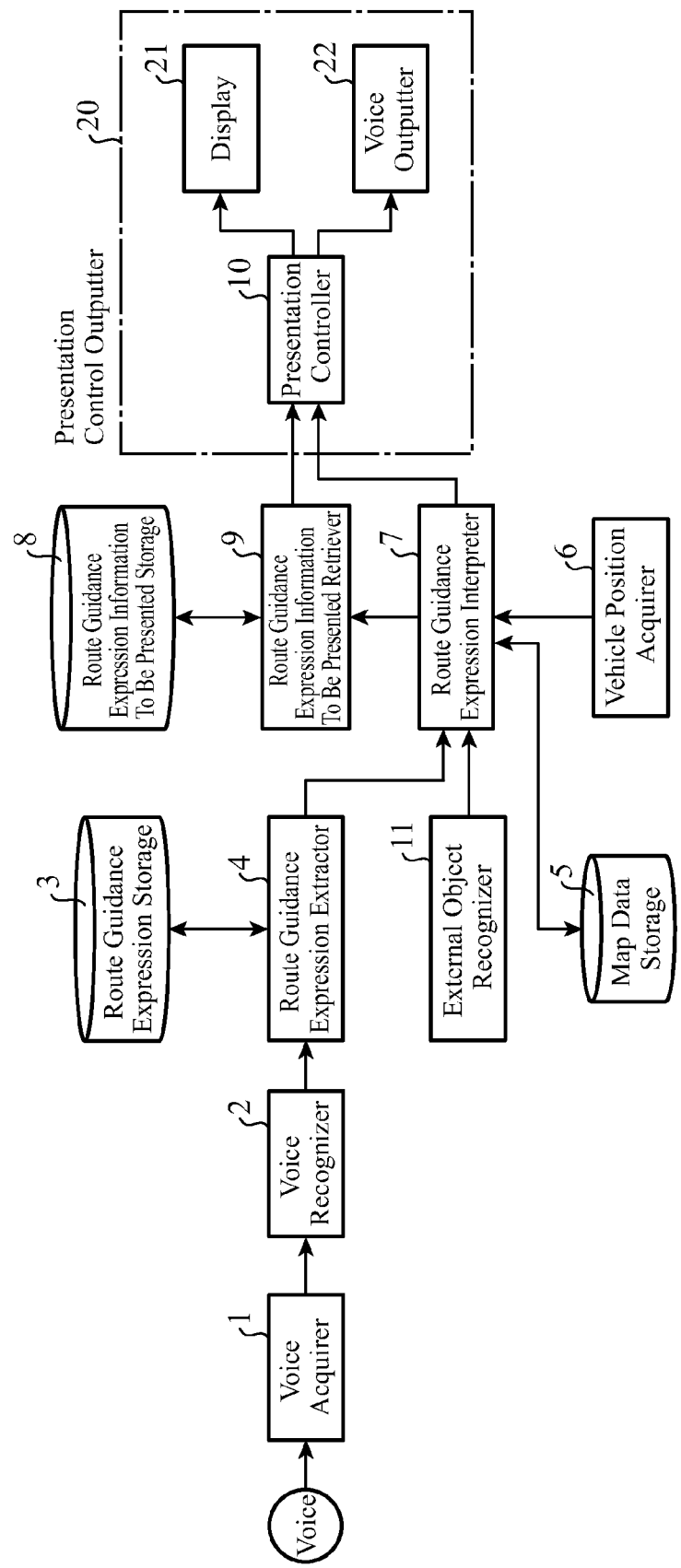
FIG. 12 is a block diagram showing an example of a navigation device in accordance with Embodiment 4.

FIG. 12 is a block diagram showing an example of a navigation device in accordance with Embodiment 4 of the present invention. The same structural components as those explained in Embodiments 1 to 3 are designated by the same reference numerals, and the duplicated explanation of the components will be omitted hereafter. In Embodiment 4 shown below, as compared with Embodiment 3, an external object recognizer 11 is shown and a route guidance expression interpreter 7 interprets a route guidance expression regarding a landmark, which is extracted by a route guidance expression extractor 4, by using information about an object which is outputted by the external object recognizer 11.

The external object recognizer 11 analyzes information acquired by a sensor, such as a camera, to recognize a surrounding object (e.g., an object such as a car or a landmark), and outputs the characteristics of the object and the distance to the object. Because a method of analyzing an image acquired by a sensor, such as a camera, to recognize an object, and a method of measuring the distance to an object are known, the explanation of the methods will be omitted hereafter. FIG. 13 is a diagram showing an example of a route guidance expression storage 3 in accordance with this Embodiment 4. As shown in this figure, this route guidance expression storage 3 has additional information about surrounding objects including the colors, the external appearances, etc. of the objects, such as "red", "white", "tall", "large", and "round."

Figure 14:
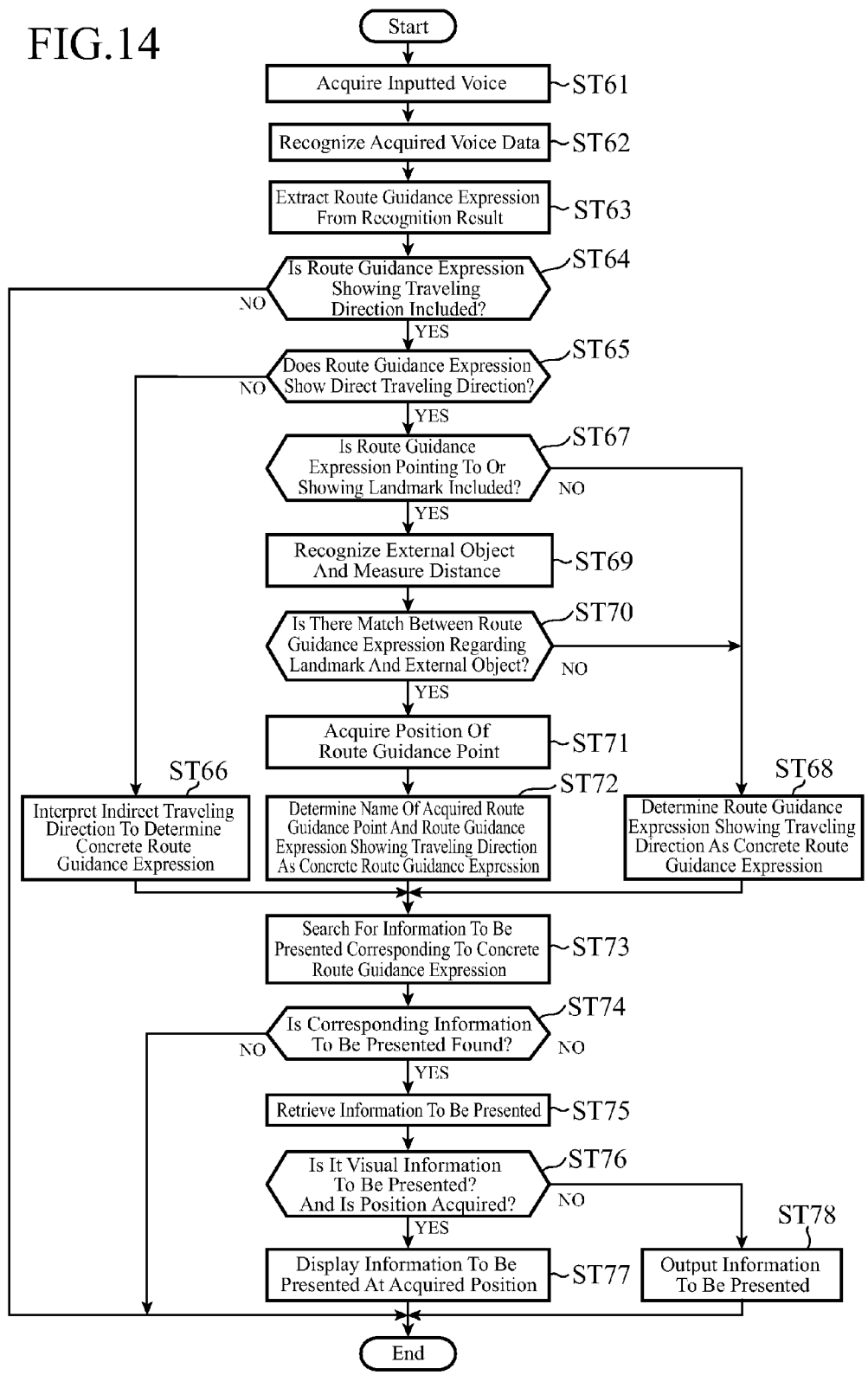
FIG. 14 is a flow chart showing the operation of the navigation device in accordance with Embodiment 4.

FIG. 14 is a flow chart showing the operation of the navigation device in accordance with Embodiment 4. Because processes in steps ST61 to ST68 and ST72 to ST78 other than steps ST69 to ST71 of this flow chart are the same as those in steps ST21 to ST28 and ST31 to ST37 of the flow chart of FIG. 7 shown in Embodiment 2, the explanation of the processes will be omitted hereafter.

In this Embodiment 4, when a route guidance expression pointing to or showing a landmark, such as "that" or "car", is included in step ST67 (when YES in step ST67), the navigation device recognizes a surrounding (exterior) object by using the external object recognizer 11 and outputs the characteristics of the object (step ST69). In addition, the route guidance expression interpreter 7 determines whether a route guidance expression, in step ST63, extracted by the route guidance expression extractor 4 matches the object recognized by the external object recognizer 11 (step ST70). When the route guidance expression matches the object (when YES in step ST70), the navigation device acquires the distance to the object which is outputted by the external object recognizer 11 by using a known method, determines the object which is a landmark, i.e., a route guidance point which route guidance should be provided on the basis of the distance information, map data, and the position and the traveling direction of the vehicle (moving object), and acquires the name and the position of the route guidance point (step ST71). In contrast, when the route guidance expression interpreter, in step ST70, determines that the route guidance expression does not match the object (when NO in step ST70), the navigation device determines a route guidance expression which is, in step ST65, determined to be a route guidance expression showing a direct traveling direction as a concrete route guidance expression (step ST68).

A concrete example will be explained. For example, it is assumed that when a red car is going to turn right at an intersection ahead of the vehicle (moving object), a fellow passenger says "Turn right there where that red car is turning." In this case, a voice acquirer 1 acquires voice data about the utterance (step ST61), and a voice recognizer 2 acquires the result of recognition of "turn right there where that red car is turning" (step ST62). A route guidance expression extractor 4 then refers to the route guidance expression storage 3 as shown in FIG. 13 to extract character strings "turn right", "that", "red", "car", etc. as route guidance expressions (step ST63). As a result, because the results of all determinations in steps ST64, ST65, and ST67 show YES, the navigation device recognizes a surrounding object by using the external object recognizer 11, such as a camera, and outputs the characteristics of the object (step ST69). In addition, the navigation device determines whether or not there is a match between a route guidance expression extracted in step ST63 and the object recognized by the external object recognizer 11 in step ST69 (step ST70). In step ST69, an image acquired with a camera is analyzed by using a known technique, and it is recognized that the object in front of the vehicle (moving object) is a "car" and the color of the car is "red." On the other hand, a route guidance expression "car" showing a landmark and a route guidance expression "red" showing additional information are extracted as the content of a fellow passenger's utterance. Therefore, because there is a match between the descriptions of the object recognized through the image analysis and the route guidance expressions extracted by the route guidance expression extractor 4 (when YES in step ST70), the navigation device determines the "red car" included in the content of the utterance as the car in front of the vehicle (moving object), acquires the distance to the red car (object) whose image is acquired by the camera by using a known method, and acquires the position (route guidance point where route guidance should be provided) where the red car is turning (step ST71). The navigation device then determines the name of the route guidance point and the route guidance expression "turn right" showing the traveling direction as a concrete route guidance expression (step ST72), and displays, for example, "graphic data about a right arrow" at the position on the display screen corresponding to the intersection where the red car is turning (steps ST73 to ST78).

Also in this embodiment, although the navigation device in accordance with this embodiment always recognizes the content of a fellow passenger's utterance, the navigation device can be alternatively constructed in such a way as to carry out voice recognition only during a predetermined time period (e.g., during a time period during which a fellow passenger is pressing a button for causing the navigation device to carry out voice recognition after starting providing route guidance for the driver). Further, the user is enabled to set whether the navigation device always carries out voice recognition or carries out voice recognition only during a predetermined time period. In addition, the user is enabled to set whether or not to use the function of recognizing a surrounding (exterior) object in accordance with this Embodiment 4.

As mentioned above, because even though a route guidance expression which is uttered by a speaking person, such as a fellow passenger, relates to a surrounding (exterior) object, the navigation device in accordance with this Embodiment 4 interprets and presents the content of the instruction, the navigation device can deal with a speaking person's various route guidance expressions, thereby being able to prevent the driver from driving the vehicle toward a direction which the speaking person does not intend.

Embodiment 5

Figure 15:
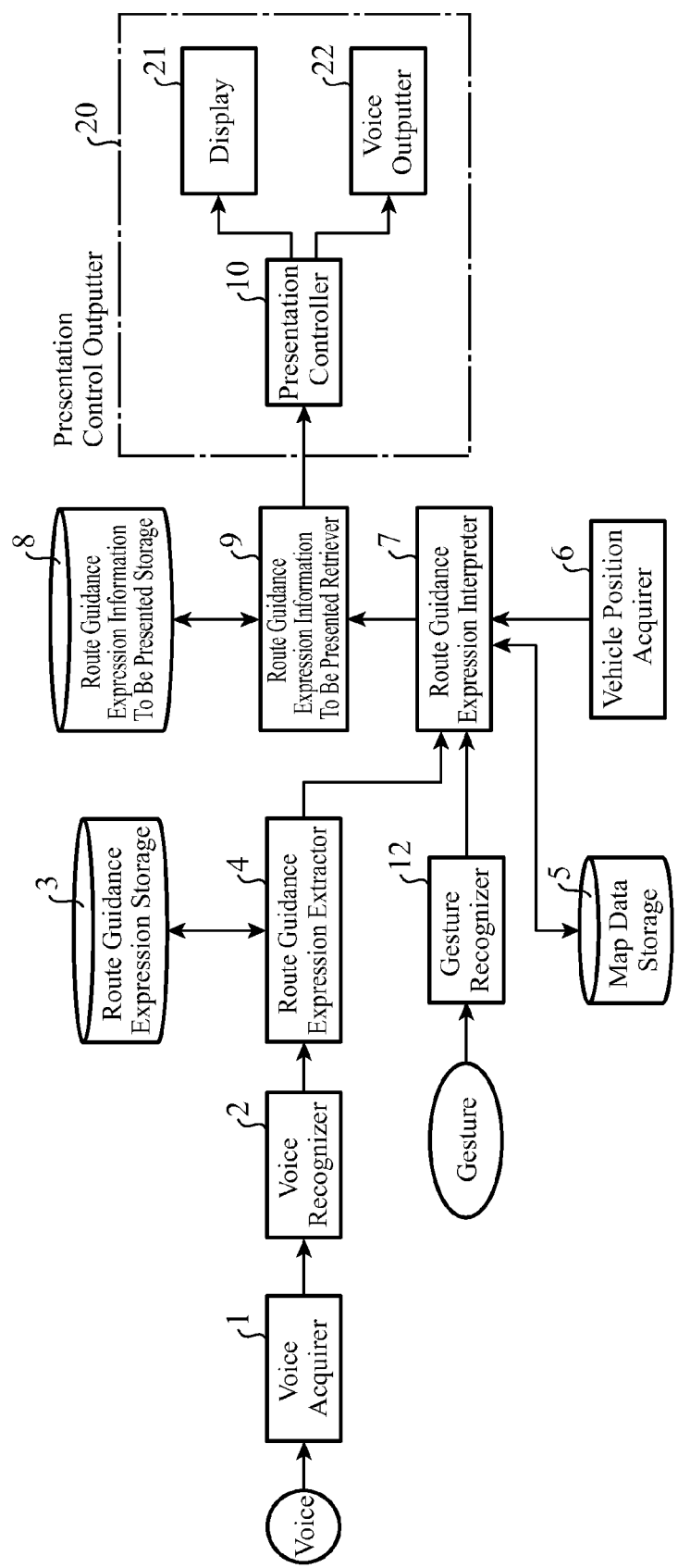
FIG. 15 is a block diagram showing an example of a navigation device in accordance with Embodiment 5.

FIG. 15 is a block diagram showing an example of a navigation device in accordance with Embodiment 5 of the present invention. The same structural components as those explained in Embodiments 1 to 4 are designated by the same reference numerals, and the duplicated explanation of the components will be omitted hereafter. In Embodiment 5 explained below, as compared with Embodiment 1, a gesture recognizer 12 is further disposed, and, when a gesture is also included in information provided by a speaking person, such as a fellow passenger, a route guidance expression interpreter 7 interprets a route guidance expression extracted by a route guidance expression extractor 4 on the basis of the result of recognition of the gesture by the gesture recognizer 12 to determine a concrete route guidance expression showing a traveling direction which the fellow passenger intends.

Figure 16:
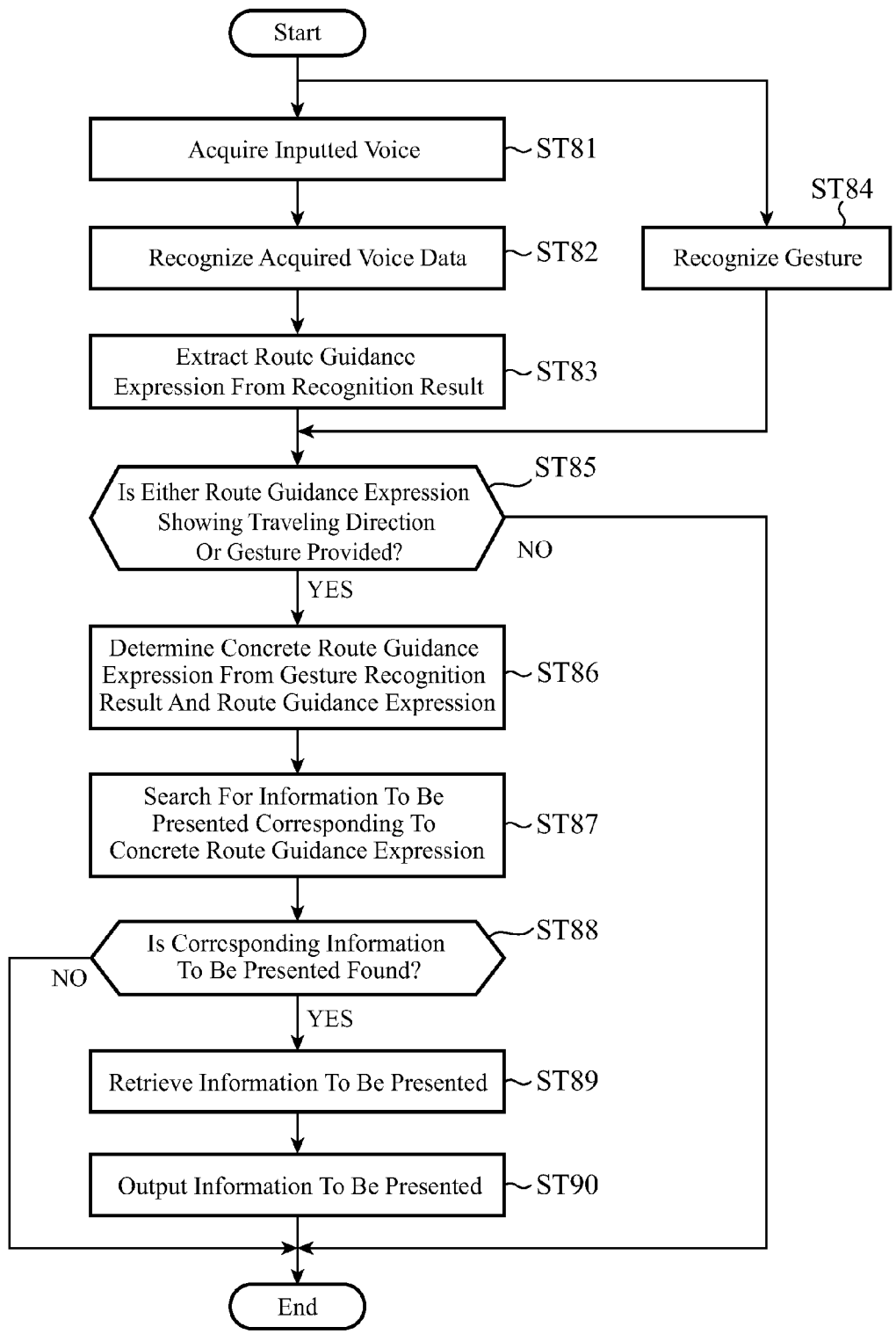
FIG. 16 is a flow chart showing the operation of the navigation device in accordance with Embodiment 5.

FIG. 16 is a flow chart showing the operation of the navigation device in accordance with Embodiment 5. Because processes in steps ST81 to ST83 and ST87 to ST90 are the same as those in steps ST01 to ST03 and ST08 to ST11 of the flowchart of FIG. 4 shown in Embodiment 1, the explanation of the processes will be omitted hereafter. In this Embodiment 5, when a gesture input is made by a fellow passenger in parallel with the processes of steps ST81 to ST83, the gesture recognizer 12 recognizes the gesture, for example, pointing to a direction which the fellow passenger has uttered, and determines and outputs the direction (step ST84). Because a method of recognizing a gesture and determining a direction pointed to by the gesture is known, the explanation of the method will be omitted hereafter.

Then, the navigation device determines whether either a condition that a route guidance expression showing a traveling direction is included in route guidance expressions extracted in step ST83 or a condition that the gesture recognized in step ST84 shows a traveling direction is satisfied (step ST85). When no route guidance expression showing a traveling direction is included and the gesture does not show a traveling direction (when NO in step ST85), the navigation device ends the processing. In contrast, when a route guidance expression showing a traveling direction is included or the gesture shows a traveling direction (when YES in step ST85), the route guidance expression interpreter 7 interprets the route guidance expression showing a traveling direction which is extracted, in step ST83, by the route guidance expression extractor 4 on the basis of both the gesture outputted, in step ST84, by the gesture recognizer 12 and the traveling direction of the vehicle (moving object) to determine a concrete route guidance expression (step ST86).

A concrete example will be explained hereafter. For example, when a fellow passenger makes a gesture of pointing to a right direction by using a finger while saying "Turn toward this direction", a voice acquirer 1 acquires voice data about the utterance (step ST81) and a voice recognizer 2 acquires the result of recognition of "turn toward this direction" (step ST82). A route guidance expression extractor 4 then extracts a character string "this direction" as a route guidance expression by referring to a route guidance expression storage 3 as shown in FIG. 2 (step ST83). Further, the gesture recognizer 12 recognizes the fellow passenger's gesture of pointing to a right direction by using a finger (step ST84). Assuming that the azimuth determined from the direction pointed to by the gesture is 90 degrees and the azimuth determined from the traveling direction of the vehicle (moving object) acquired by a vehicle position acquirer (position acquirer) 6 is 45 degrees, the route guidance expression interpreter 7 determines that the indirect route guidance expression "this direction" showing the traveling direction is "right" from (90 degrees−45 degrees)>0. More specifically, the route guidance expression interpreter 7 determines a concrete route guidance expression "right" from the character string "this direction" showing a traveling direction, the right-pointing gesture showing a traveling direction, and the traveling direction of the vehicle (moving object) (steps ST85 to ST86).

Also in this embodiment, although the navigation device in accordance with this embodiment always recognizes the content of a fellow passenger's utterance, the navigation device can be alternatively constructed in such a way as to carry out voice recognition only during a predetermined time period (e.g., during a time period during which a fellow passenger is pressing a button for causing the navigation device to carry out voice recognition after starting providing guidance for the driver). Further, the user is enabled to set whether the navigation device always carries out voice recognition or carries out voice recognition only during a predetermined time period. In addition, the user is enabled to set whether or not to use the function of recognizing a gesture in accordance with this Embodiment 5.

As mentioned above, because even though a route guidance expression which is uttered by a speaking person, such as a fellow passenger, is an abstract route guidance expression and cannot be interpreted as a concrete content from map data and the position of the vehicle (moving object), the navigation device in accordance with this Embodiment 5 can determine a concrete route guidance expression by bringing the route guidance expression into correspondence with the result of recognition of a gesture, the navigation device can prevent the driver from driving the vehicle toward a direction which the speaking person does not intend.

Embodiment 6

Figure 17:
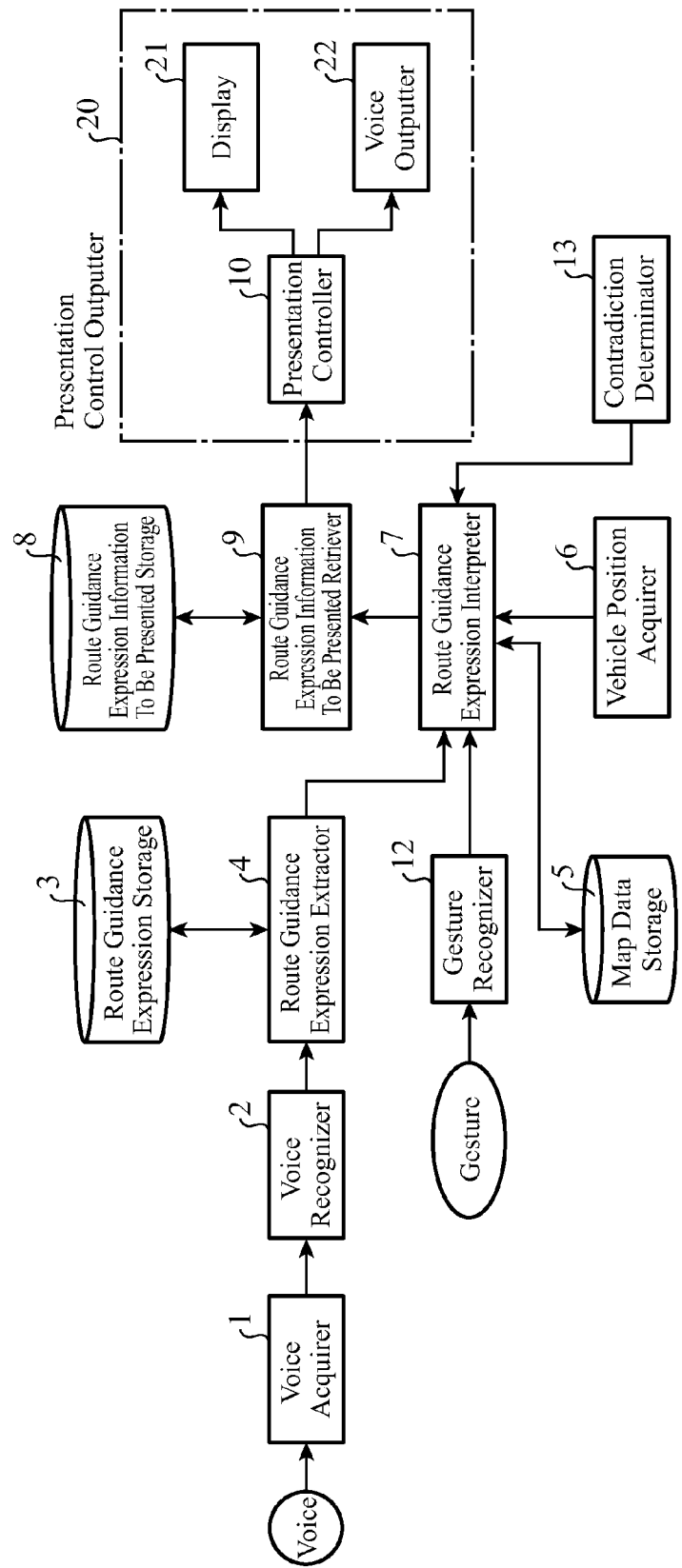
FIG. 17 is a block diagram showing an example of a navigation device in accordance with Embodiment 6.

FIG. 17 is a block diagram showing an example of a navigation device in accordance with Embodiment 6 of the present invention. The same structural components as those explained in Embodiments 1 to 5 are designated by the same reference numerals, and the duplicated explanation of the components will be omitted hereafter. In Embodiment 6 explained below, as compared with Embodiment 5, the navigation device further includes a contradiction determinator 13, and, when there is a contradiction between route guidance expressions extracted from the content of an utterance made by a speaking person, such as a fellow passenger, and the result of recognition of a gesture, determines the content of a route guidance expression on the basis of a result determined by a route guidance expression interpreter 7.

Figure 18:
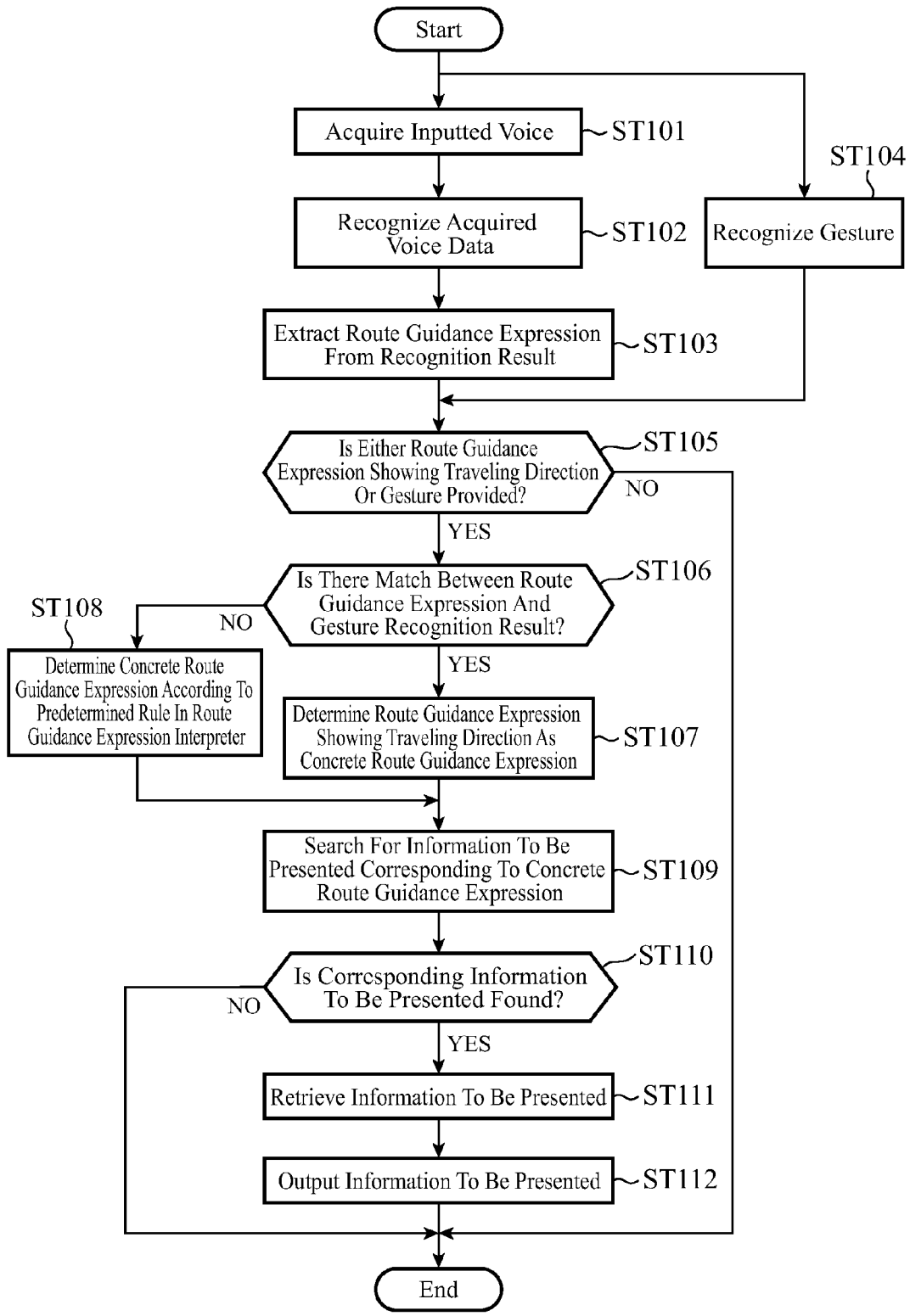
FIG. 18 is a flow chart showing the operation of the navigation device in accordance with Embodiment 6.

FIG. 18 is a flow chart showing the operation of the navigation device in accordance with Embodiment 6. Because processes in steps ST101 to ST105 and ST109 to ST112 are the same as those in steps ST81 to ST85 and ST87 to S90 of the flow chart of FIG. 16 shown in Embodiment 5, the explanation of the processes will be omitted hereafter. The navigation device in accordance with this Embodiment 6 determines whether or not there is a match between a route guidance expression extracted in step ST103 and the result of recognition of a gesture recognized in step ST104 (step ST106). When there is a match between the route guidance expression and the result of recognition of the gesture (when YES in step ST106), the navigation device determines a route guidance expression showing a traveling direction (=a gesture showing a traveling direction) as a concrete route guidance expression (step ST107).

In contrast, when there is a mismatch between the route guidance expression and the result of recognition of the gesture in the determination of step ST106 (when NO in step ST106), the navigation device determines a concrete route guidance expression according to a predetermined rule in a route guidance expression interpreter 7 (step ST108). For example, this predetermined rule in the route guidance expression interpreter 7 is a rule of "selecting the result of recognition of the gesture when there is a contradiction between the recognition result and the route guidance expression" on the basis of statistics showing that the frequency with which a fellow passenger makes a mistake in speaking is higher than that with which a fellow passenger points to a wrong direction by using a gesture, a rule of "when a route setting is made, selecting one matching the set route from the result of recognition of the gesture and the route guidance expression", or the like. The predetermined rule can be set in advance.

A concrete example will be explained hereafter. For example, when a fellow passenger makes a gesture of pointing to the left by using a finger while saying "Turn right at the next intersection", a voice acquirer 1 acquires voice data about the utterance (step ST101) and a voice recognizer 2 acquires the result of recognition of "turn right at the next intersection" (step ST102). A route guidance expression extractor 4 then extracts character strings "right", "next", and "intersection", as route guidance expressions, by referring to a route guidance expression storage 3 as shown in FIG. 2 (step ST103). Further, a gesture recognizer 12 recognizes the gesture of pointing to the left by using a finger (step ST104). In this case, the navigation device determines whether or not there is a match between the route guidance expression "right" extracted in step ST103 and the gesture of pointing to the "left" recognized in step ST104 (steps ST105 to ST106).

In this example, because there is a mismatch between the route guidance expression and the gesture (when NO in step ST106), the route guidance expression interpreter 7 determines a concrete route guidance expression according to the predetermined rule, such as a rule of, when, for example, a route setting is made, selecting one matching the set route from the result of recognition of the gesture and the route guidance expression, or a rule of, when no route setting is made, selecting the result of recognition of the gesture. In this example, assuming that the rule of "selecting the result of recognition of the gesture when there is a contradiction between the recognition result and the route guidance expression" is set, the route guidance expression interpreter 7 determines "left" which is the result of recognition of the gesture as a concrete route guidance expression according to the predetermined rule (step ST108).

As mentioned above, because even in a case in which there is a contradiction between a route guidance expression which is uttered by a speaking person, such as a fellow passenger, and the result of recognition of a gesture made by the fellow passenger, the navigation device in accordance with this Embodiment 6 selects either one of them according to a predetermined rule in the route guidance expression interpreter 7, the navigation device can prevent the driver from driving the vehicle toward a wrong direction due to a fellow passenger's mistake in speaking or in making a gesture.

Although above-mentioned Embodiments 5 and 6 are explained by assuming that the navigation device in accordance with Embodiment 1 further includes the gesture recognizer 12 or the contradiction determinator 13, it is needless to say that the navigation device in accordance with Embodiment 2 can include the gesture recognizer 12 or the contradiction determinator 13.

Embodiment 7

Figure 19:
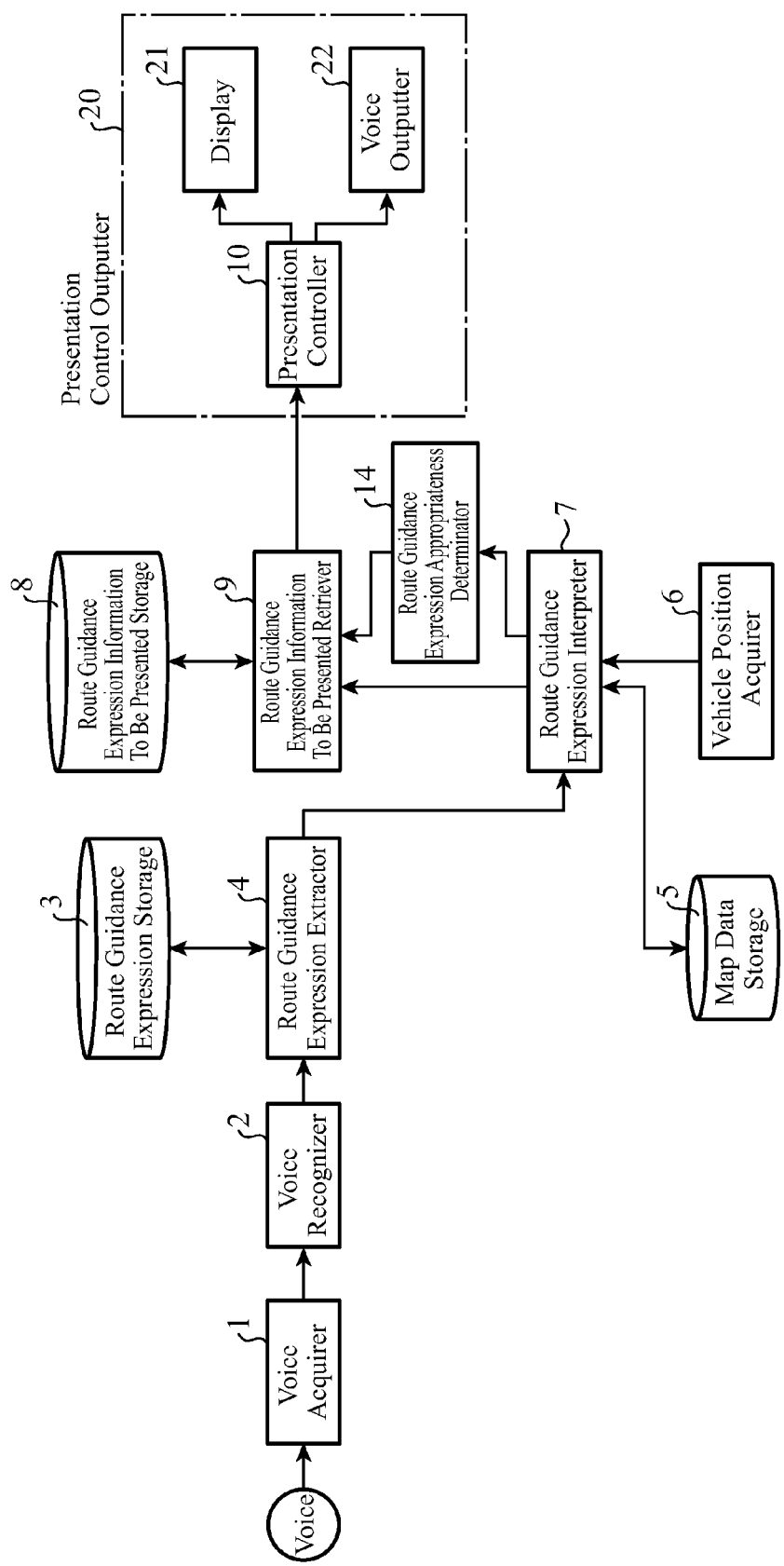
FIG. 19 is a block diagram showing an example of a navigation device in accordance with Embodiment 7.

FIG. 19 is a block diagram showing an example of a navigation device in accordance with Embodiment 7 of the present invention. The same structural components as those explained in Embodiments 1 to 6 are designated by the same reference numerals, and the duplicated explanation of the components will be omitted hereafter. In Embodiment 7 explained below, as compared with Embodiment 1, the navigation device further includes a route guidance expression appropriateness determinator 14, and, after determining whether or not information to be presented is appropriate, presents a route guidance expression. The route guidance expression appropriateness determinator 14 makes a determination as to the appropriateness of presenting information to be presented. In this embodiment, the appropriateness shows, for example, whether or not a vehicle can travel toward a direction pointed to by a speaking person, whether or not the vehicle will deviate from a set route when travelling toward the direction pointed to, or the like.

Figure 20:
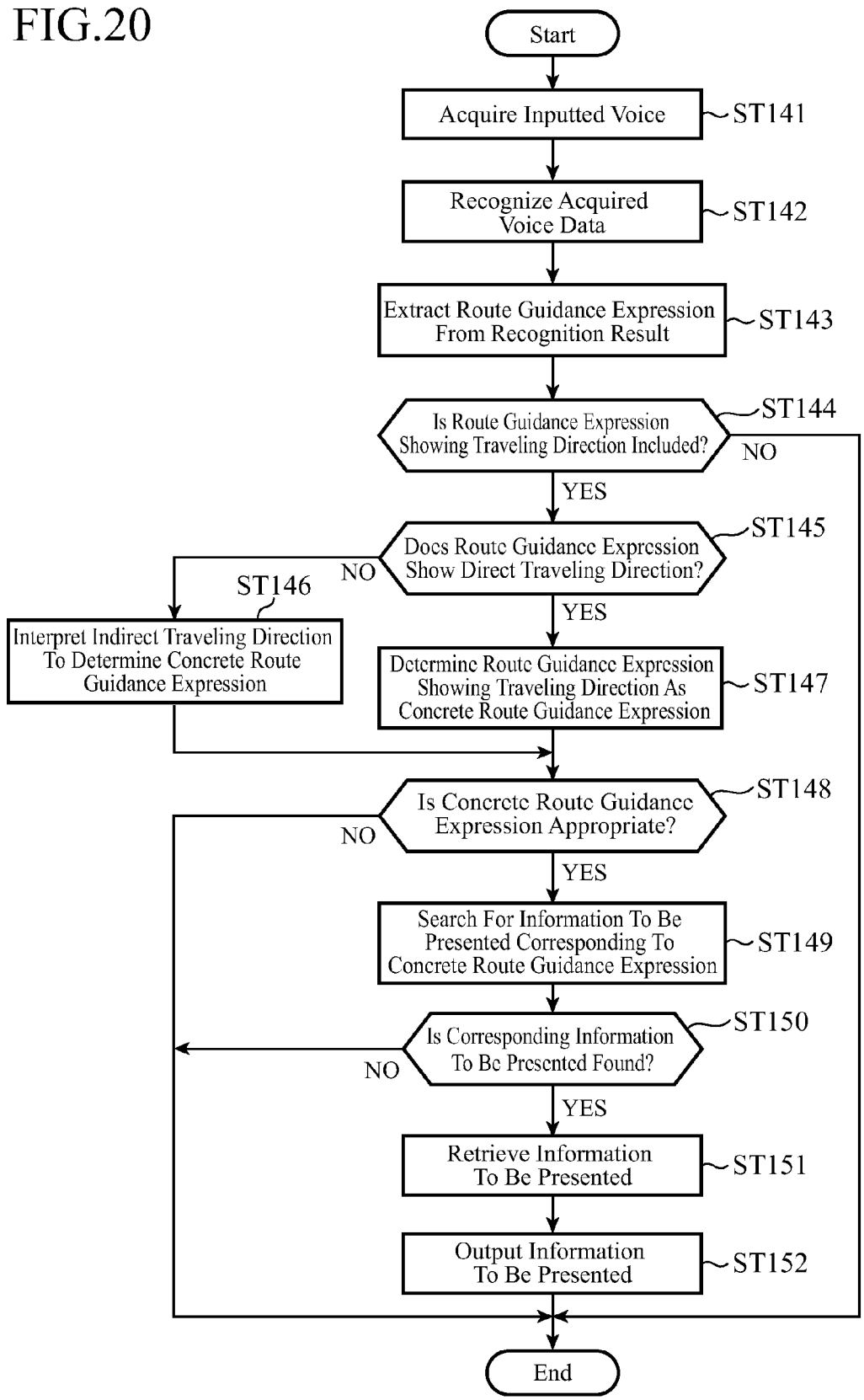
FIG. 20 is a flow chart showing the operation of the navigation device in accordance with Embodiment 7.

FIG. 20 is a flow chart showing the operation of the navigation device in accordance with Embodiment 7. Because processes in steps ST141 to ST147 are the same as those in steps ST01 to ST07 of the flow chart of FIG. 4 shown in Embodiment 1, the explanation of the processes will be omitted hereafter. The route guidance expression appropriateness determinator 14 in accordance with this Embodiment 7 determines whether or not it is appropriate to present a route guidance expression on the basis of route guidance expressions, in step ST143, extracted by a route guidance expression extractor, a vehicle position (the position of a moving object) acquired by a vehicle position acquirer (position acquirer) 6, and map data stored in a map data storage 5 (step ST148). At this time, when determining that it is appropriate to present a route guidance expression (YES in step ST148), the navigation device searches for information to be presented corresponding to the route guidance expression (step ST149), and, when finding the corresponding information to be presented, retrieves and outputs the information to be presented (steps ST150 to ST152), like in the case of in steps ST08 to ST11 of FIG. 4 shown in Embodiment 1. In contrast, when, in step ST148, determining that it is not appropriate to present the route guidance expression (NO in step ST148), the navigation device ends the processing.

A concrete example will be explained hereafter. For example, when a fellow says "Turn right at the next intersection", a voice acquirer 1 acquires voice data about the utterance (step ST141) and a voice recognizer 2 acquires the result of recognition of "turn right at the next intersection" (step ST142). A route guidance expression extractor 4 then extracts character strings "turn right" and "next intersection" as route guidance expressions by referring to a route guidance expression storage 3 as shown in FIG. 2 (step ST143). In this case, because "turn right" is a route guidance expression showing a direct traveling direction (when YES in step ST144 and YES also in step ST145), a route guidance expression interpreter 7 determines the route guidance expression "turn right" as a concrete route guidance expression (step ST147).

In this case, the navigation device determines the "next intersection" on the basis of the vehicle position and map data, and, when the result of checking to see road information when the vehicle makes a right turn at the intersection by using the map data shows, for example, a no entry restriction due to a one-way restriction, determines that the route guidance expression is not appropriate (when NO in step ST148), and ends the processing. Further, also when the vehicle will deviate from the set route if the vehicle turns right at the intersection, for example, the navigation device similarly determines that the route guidance expression is not appropriate. In contrast, when determining that the route guidance expression is appropriate (when YES in step ST148), the navigation device carries out the same processes as those in steps ST08 to ST11 of Embodiment 1 (steps ST149 to ST152), and outputs either information, such as "graphic data about a right arrow", "character string data "turn right"", "coloring the road in red", or "setting the width of the road to OO dots", or "voice data about a voice "turn right"" which is auditory information to be presented.

Also in this embodiment, although the navigation device in accordance with this embodiment always recognizes the content of a fellow passenger's utterance, the navigation device can be alternatively constructed in such a way as to carry out voice recognition only during a predetermined time period (e.g., during a time period during which a fellow passenger is pressing a button for causing the navigation device to carry out voice recognition after starting providing route guidance for the driver). Further, the user is enabled to set whether the navigation device always carries out voice recognition or carries out voice recognition only during a predetermined time period. In addition, the user is enabled to set whether or not to use the function of making a determination as to the appropriateness of a route guidance expression in accordance with this Embodiment 7.

As mentioned above, because the navigation device in accordance with this Embodiment 7 determines whether or not a route guidance expression which is uttered by a speaking person, such as a fellow passenger, is appropriate, in addition to the advantages provided by Embodiment 1, the navigation device can prevent information to be presented from being presented on the basis of a speaking person's inappropriate utterance, thereby preventing the driver from travelling along a wrong route and committing a traffic violation.

Embodiment 8

Because a block diagram showing an example of a navigation device in accordance with Embodiment 8 of the present invention is the same as that shown in FIG. 19 shown in Embodiment 7, an illustration and an explanation of the structural components of the navigation device in accordance with Embodiment 8 will be omitted hereafter. In Embodiment 8 explained below, as compared with Embodiment 7, when a route guidance expression appropriateness determinator 14 determines that a route guidance expression is not appropriate, the navigation device presents information to be presented showing that the route guidance expression is not appropriate. Further, at that time, a route guidance expression information to be presented retriever 9 retrieves the information to be presented showing that the route guidance expression is not appropriate from a route guidance expression information to be presented storage 8. Although an illustration of the information to be presented showing that a route guidance expression is not appropriate, which is stored in the route guidance expression information to be presented storage 8, is omitted, as corresponding information to be presented when the route guidance expression appropriateness determinator 14 determines that a route guidance expression is not appropriate, for example, graphic data about "x", a character string "impassable", and a character string "you will deviate from the route" are stored.

Figure 21:
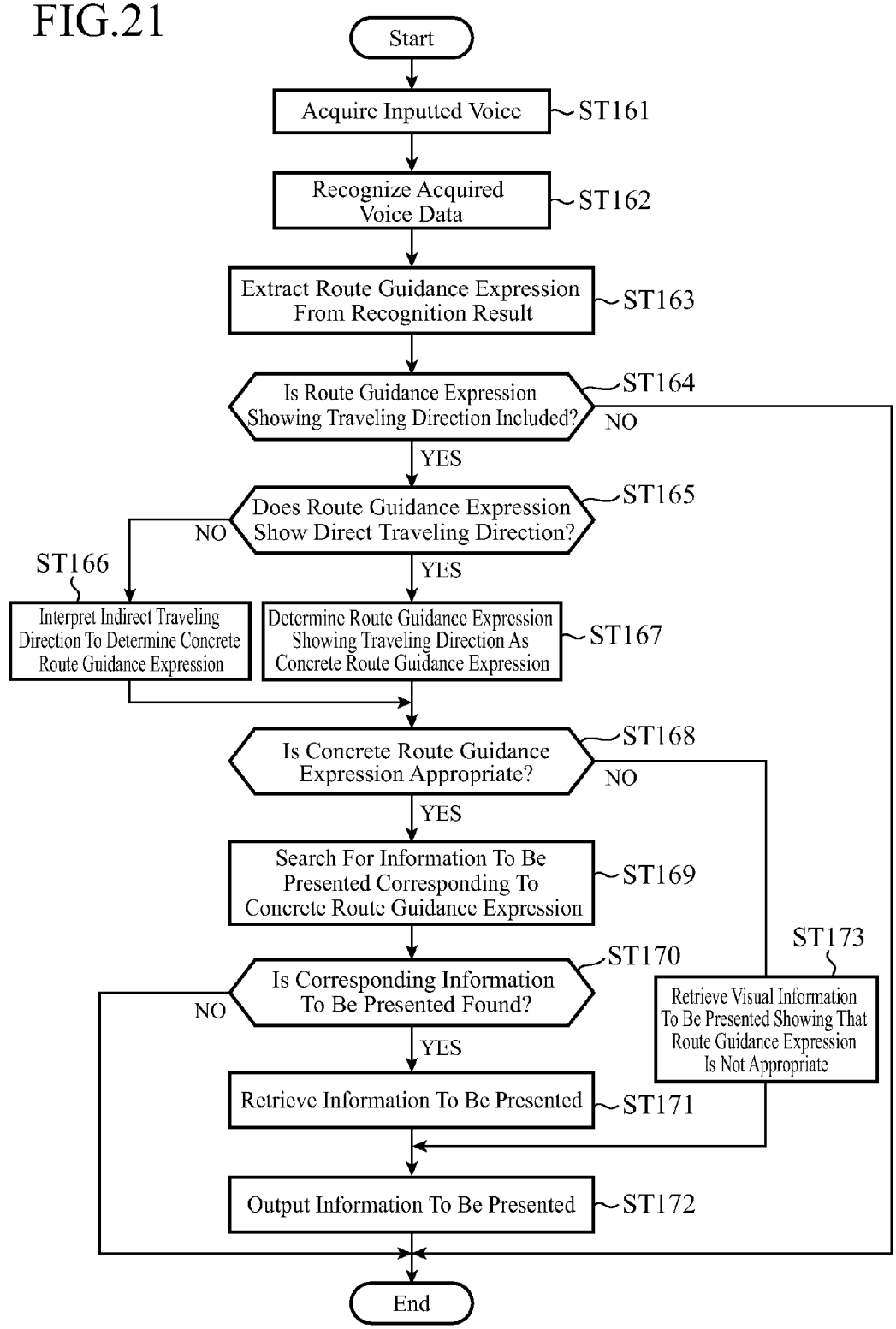
FIG. 21 is a flow chart showing the operation of a navigation device in accordance with Embodiment 8.

FIG. 21 is a flow chart showing the operation of the navigation device in accordance with Embodiment 8. Because processes in steps ST161 to ST172 are nearly the same as those in steps ST141 to ST152 of the flow chart of FIG. 20 shown in Embodiment 7, the explanation of the processes will be omitted hereafter. A route guidance expression appropriateness determinator 14 in accordance with this Embodiment 9, in step ST168, determines whether or not it is appropriate to present a route guidance expression, and, when determining that it is appropriate to present the route guidance expression (when YES in step ST168), searches for information to be presented corresponding to the route guidance expression (step ST169), like in the case of steps ST149 to ST152 of FIG. 20 shown in Embodiment 7, and, when finding corresponding information to be presented, retrieves and outputs the information to be presented (steps ST170 to ST172). In contrast, when, in step ST168, determining that it is not appropriate to present the route guidance expression (when NO in step ST168), a route guidance expression information to be presented retriever 9 in accordance with this Embodiment 8 retrieves information to be presented showing that the route guidance expression is not appropriate (step ST173) and outputs the information to be presented (step ST172), whereas the route guidance expression information to be presented retriever in accordance with Embodiment 7 simply ends the process.

A concrete example will be explained hereafter. For example, when a fellow says "Turn right at the next intersection", a voice acquirer 1 acquires voice data about the utterance (step ST161) and a voice recognizer 2 acquires the result of recognition of "turn right at the next intersection" (step ST162), like in the case of Embodiment 7. A route guidance expression extractor 4 then extracts character strings "turn right" and "next intersection" as route guidance expressions by referring to a route guidance expression storage 3 as shown in FIG. 2 (step ST163). In this case, because "turn right" is a route guidance expression showing a direct traveling direction (when YES in step ST164 and YES also in step ST165), a route guidance expression interpreter 7 determines the route guidance expression "turn right" as a concrete route guidance expression (step ST167).

In this case, the navigation device determines the "next intersection" on the basis of a vehicle position and map data, and, when the result of checking to see road information when the vehicle makes a right turn at the intersection by using the map data shows, for example, a no entry restriction due to a one-way restriction, determines that the route guidance expression is not appropriate (when NO in step ST168). Further, also when the vehicle will deviate from the set route if the vehicle turns right at the intersection, for example, the navigation device similarly determines that the route guidance expression is not appropriate. In this case, the route guidance expression information to be presented retriever 9 retrieves, for example, graphic data about "x", a character string "impassable", a character string "you will deviate from the route", or the like from the route guidance expression information to be presented storage 8 (step ST173), and outputs the information (step ST172).

Also in this embodiment, although the navigation device in accordance with this embodiment always recognizes the content of a fellow passenger's utterance, the navigation device can be alternatively constructed in such a way as to carry out voice recognition only during a predetermined time period (e.g., during a time period during which a fellow passenger is pressing a button for causing the navigation device to carry out voice recognition after starting providing route guidance for the driver). Further, the user is enabled to set whether the navigation device always carries out voice recognition or carries out voice recognition only during a predetermined time period. In addition, the user is enabled to set whether or not to use the function of making a determination as to the appropriateness of a route guidance expression in accordance with this Embodiment 8.

As mentioned above, because the navigation device in accordance with this Embodiment 8 determines whether or not a route guidance expression which is uttered by a speaking person, such as a fellow passenger, is appropriate, and, when the route guidance expression is not appropriate, presents to that effect, in addition to the advantages provided by Embodiment 1, the navigation device can not only prevent information to be presented from being presented on the basis of a speaking person's inappropriate utterance, and but also enable the driver to understand that the content of the utterance which the driver himself or herself has recognized is not appropriate, thereby preventing the driver from travelling along a wrong route and committing a traffic violation.

Embodiment 9

Figure 22:
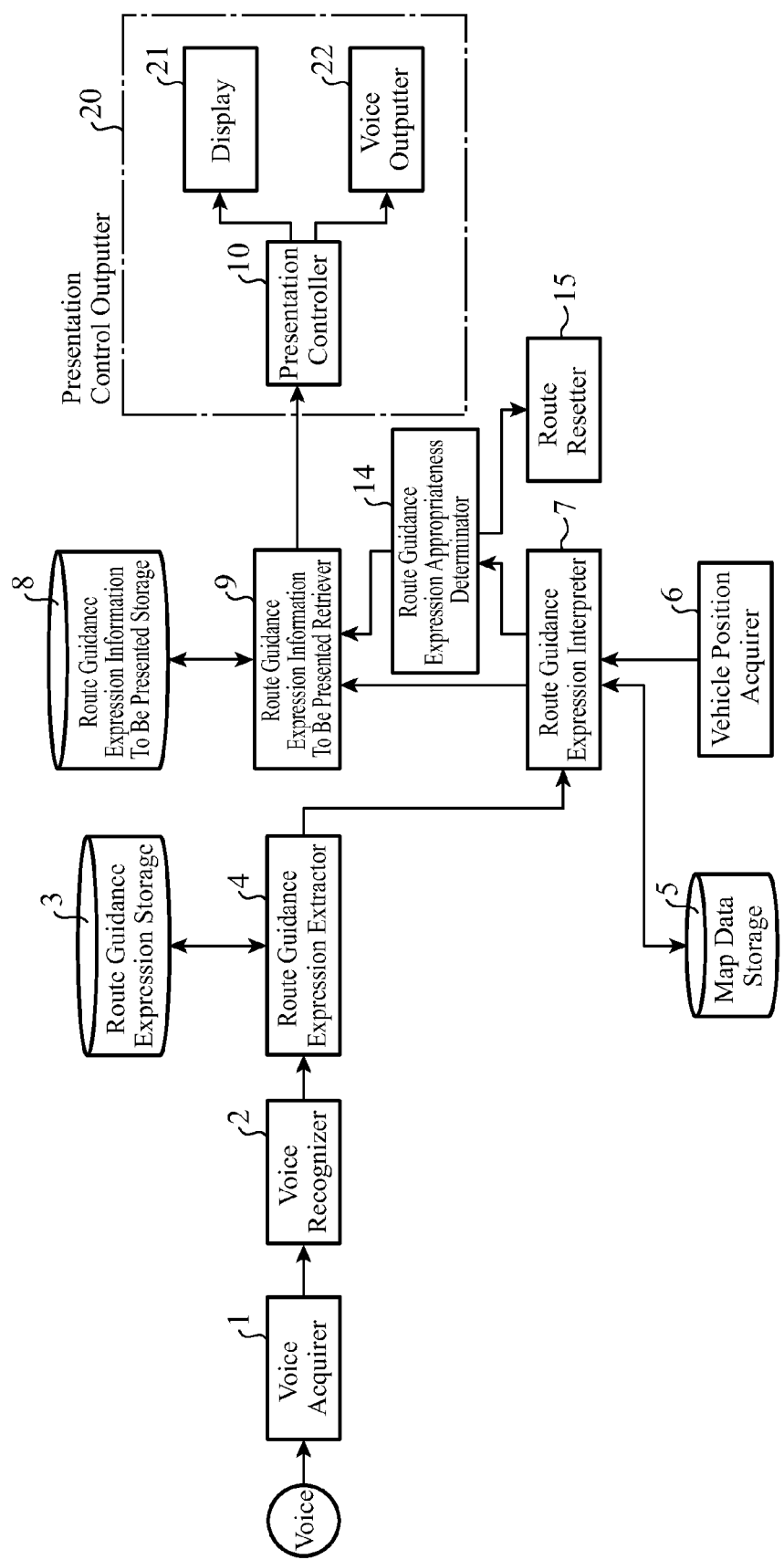
FIG. 22 is a block diagram showing an example of a navigation device in accordance with Embodiment 9.

FIG. 22 is a block diagram showing an example of a navigation device in accordance with Embodiment 9 of the present invention. The same structural components as those explained in Embodiments 1 to 8 are designated by the same reference numerals, and the duplicated explanation of the components will be omitted hereafter. In Embodiment 9 explained below, as compared with Embodiment 7, the navigation device further includes a route resetter 15, and, when a route guidance expression appropriateness determinator 14 determines that information to be presented (a route guidance expression) is not appropriate because a vehicle will deviate from a set route, resets a route to a destination which includes, as a waypoint, the above-mentioned route from which the vehicle will deviate. When the route guidance expression appropriateness determinator 14 determines that a route guidance expression is not appropriate because the vehicle will deviate from the set route, the route resetter 15 resets a route to the destination which includes, as a waypoint, the above-mentioned route from which the vehicle will deviate.

Figure 23:
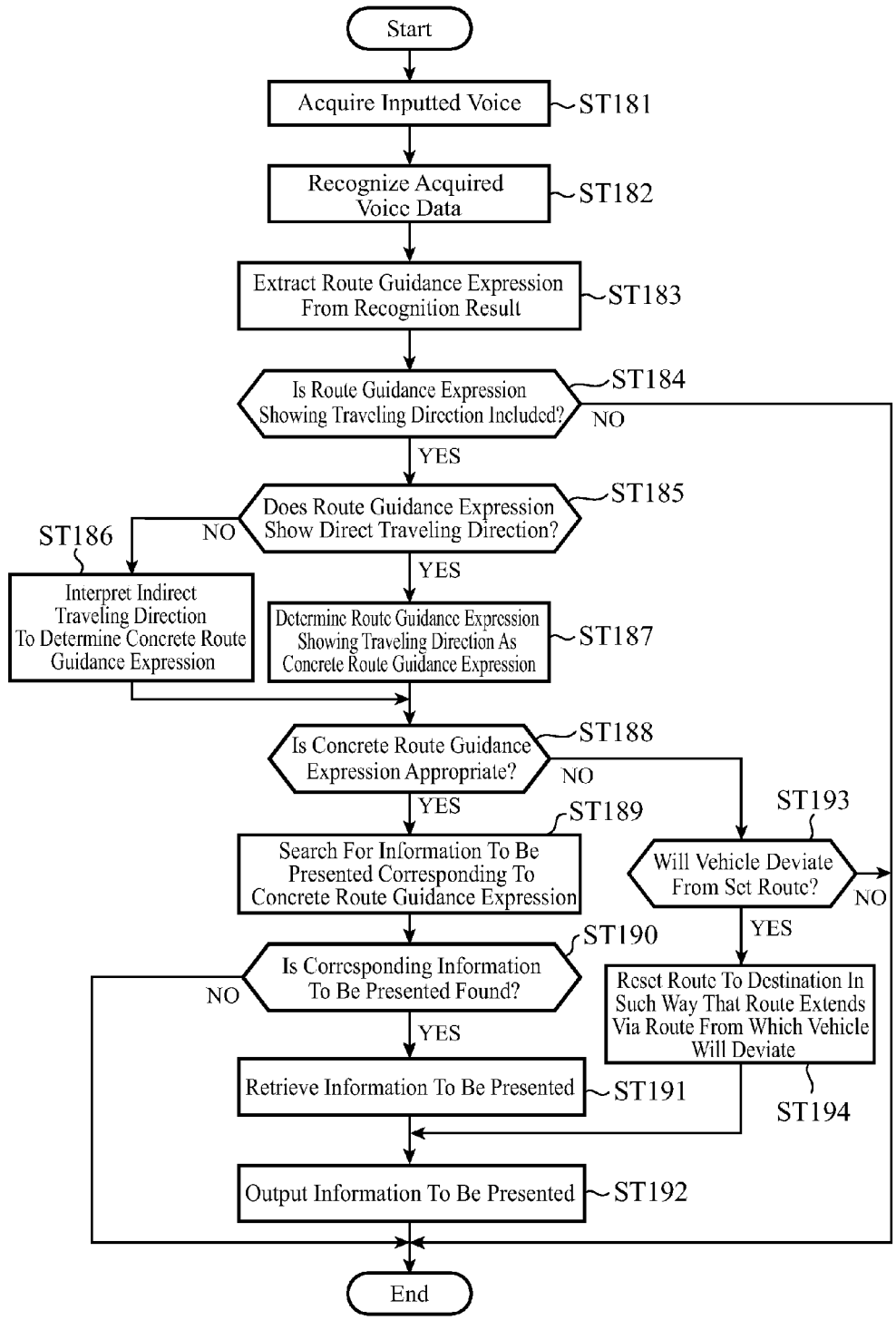
FIG. 23 is a flow chart showing the operation of the navigation device in accordance with Embodiment 9.

FIG. 23 is a flow chart showing the operation of the navigation device in accordance with Embodiment 9. Because processes in steps ST181 to ST192 are nearly the same as those in steps ST41 to ST152 of the flow chart of FIG. 20 shown in Embodiment 7, the explanation of the processes will be omitted hereafter. The route guidance expression appropriateness determinator 14 in accordance with this Embodiment 9, in step ST188, determines whether or not it is appropriate to present a route guidance expression, and, when determining that it is appropriate to present the route guidance expression (when YES in step ST188), searches for information to be presented corresponding to the route guidance expression (step ST189), like in the case of steps ST149 to ST152 of FIG. 20 shown in Embodiment 7, and, when finding corresponding information to be presented, retrieves and outputs the information to be presented (steps ST190 to ST192). In contrast, when, in step ST188, determining that the route guidance expression is not appropriate (when NO in step ST188), the navigation device in accordance with this Embodiment 9 determines if the route guidance expression has been determined to be not appropriate because the vehicle will deviate from the set route (step ST193), whereas the navigation device in accordance with Embodiment 7 simply ends the processing, and, when determining that the route guidance expression has been determined to be not appropriate because the vehicle will deviate from the set route (when YES in step ST193), the route resetter 15 resets a route to the destination in such a way that the route extends via the above-mentioned route from which the vehicle will deviate (step ST194). In contrast, when determining that the route guidance expression has been determined to be not appropriate for another reason (when NO in step ST193), the navigation device ends the processing.

A concrete example will be explained hereafter. For example, when a fellow says "Turn right at the next intersection", a voice acquirer 1 acquires voice data about the utterance (step ST181) and a voice recognizer 2 acquires the result of recognition of "turn right at the next intersection" (step ST182), like in the case of Embodiment 7. A route guidance expression extractor 4 then extracts character strings "turn right" and "next intersection" as route guidance expressions by referring to a route guidance expression storage 3 as shown in FIG. 2 (step ST183). In this case, because "turn right" is a route guidance expression showing a direct traveling direction (when YES in step ST184 and YES also in step ST185), a route guidance expression interpreter 7 determines the route guidance expression "turn right" as a concrete route guidance expression (step ST187).

In this case, the navigation device determines the "next intersection" on the basis of a vehicle position and map data, and, when the result of checking to see road information when the vehicle makes a right turn at the intersection by using the map data shows, for example, a no entry restriction due to a one-way restriction, determines that the route guidance expression is not appropriate (when NO in step ST188). The navigation device further determines whether or not the reason why the route guidance expression is determined to be not appropriate is because the vehicle will deviate from the set route (step ST188), and ends the processing because the result of the determination shows NO. In contrast, because it is determined, in step ST188, that when the vehicle will deviate from the set route if, for example, the vehicle turns right at the intersection in the determination in step ST188, the route guidance expression is not appropriate in the same way (when NO in step ST188), and the reason why the route guidance expression is determined to be not appropriate is because the vehicle will deviate from the set route (when YES in step ST193), the route resetter 15 resets a route to the destination in such a way that the route extends via the above-mentioned route from which the vehicle will deviate (step ST194).

Also in this embodiment, although the navigation device in accordance with this embodiment always recognizes the content of a fellow passenger's utterance, the navigation device can be alternatively constructed in such a way as to carry out voice recognition only during a predetermined time period (e.g., during a time period during which a fellow passenger is pressing a button for causing the navigation device to carry out voice recognition after starting providing route guidance for the driver). Further, the user is enabled to set whether the navigation device always carries out voice recognition or carries out voice recognition only during a predetermined time period. In addition, the user is enabled to set whether or not to use the function of resetting a route in accordance with this Embodiment 9.

As mentioned above, because the navigation device in accordance with this Embodiment 9 determines whether or not a route guidance expression which is uttered by a speaking person, such as a fellow passenger, is appropriate, and, when determining that the route guidance expression is not appropriate because the vehicle will deviate from the route, resets a route to the destination in such a way that the route extends via the route from which the vehicle will deviate, in addition to the advantages provided by Embodiment 1, when a speaking person provides route guidance with the intention of changing the route, the navigation device can prevent the intention from being reflected because the route guidance expression is determined to be not appropriate.

Although the example in which the navigation device in accordance with Embodiment 1 further includes the route guidance expression appropriateness determinator 14 or the route resetter 15 is explained in above-mentioned Embodiments 7 to 9, it is needless to say that the navigation device in accordance with Embodiment 2 can further include the route guidance expression appropriateness determinator 14 or the route resetter 15.

Embodiment 10

Figure 24:
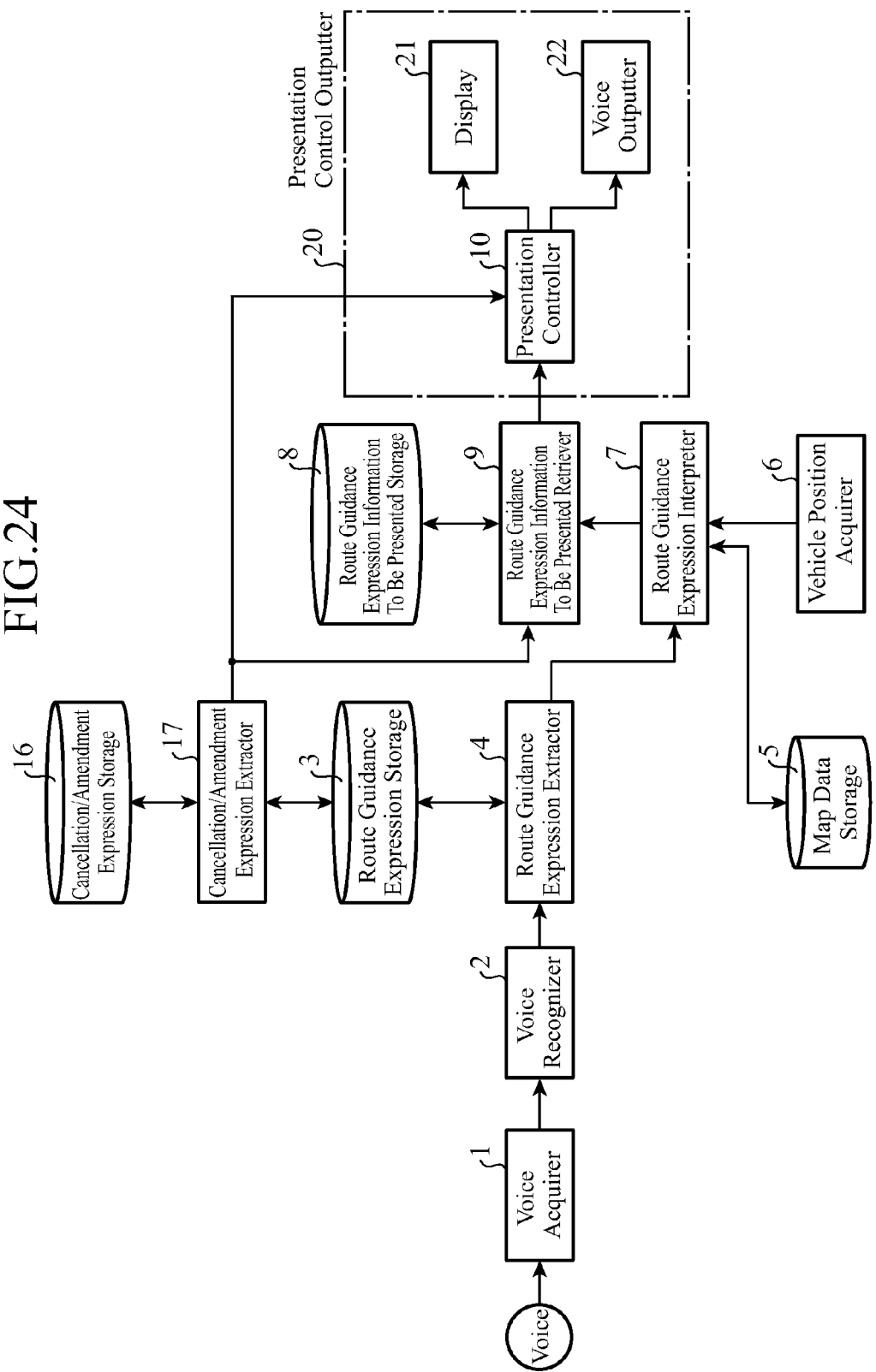
FIG. 24 is a block diagram showing an example of a navigation device in accordance with Embodiment 10.

FIG. 24 is a block diagram showing an example of a navigation device in accordance with Embodiment 10 of the present invention. The same structural components as those explained in Embodiments 1 to 9 are designated by the same reference numerals, and the duplicated explanation of the components will be omitted hereafter. In Embodiment 10 explained below, as compared with Embodiment 1, the navigation device further includes a cancellation/amendment expression storage 16 and a cancellation/amendment expression extractor 17, and, when an expression showing that presentation of information to be presented is canceled is extracted, does not output this information to be presented, and, when an expression showing that presentation of information to be presented is amended is extracted, outputs the amended information to be presented.

The cancellation/amendment expression storage 16 typically stores expressions each of which is used by a person when he or she makes a mistake in speaking while providing route guidance or when he or she provides wrong route guidance. FIG. 25 is a diagram showing an example of the cancellation/amendment expression storage 16. As shown in this figure, for example, the cancellation/amendment expression storage 16 stores cancellation expressions "I'm wrong", "I was wrong", "I've made a mistake", etc., and amendment expressions "scratch that", "stop", etc. The cancellation/amendment expression extractor carries a morphological analysis by referring to the cancellation/amendment expression storage 16, and extracts a cancellation expression and an amendment expression from a character string which is the result of voice recognition by a voice recognizer 2. Further, when extracting an amendment expression, the cancellation/amendment expression extractor also extracts a route guidance expression following the amendment expression, i.e., an amended route guidance expression by referring to a route guidance expression storage 3.

Figure 26:
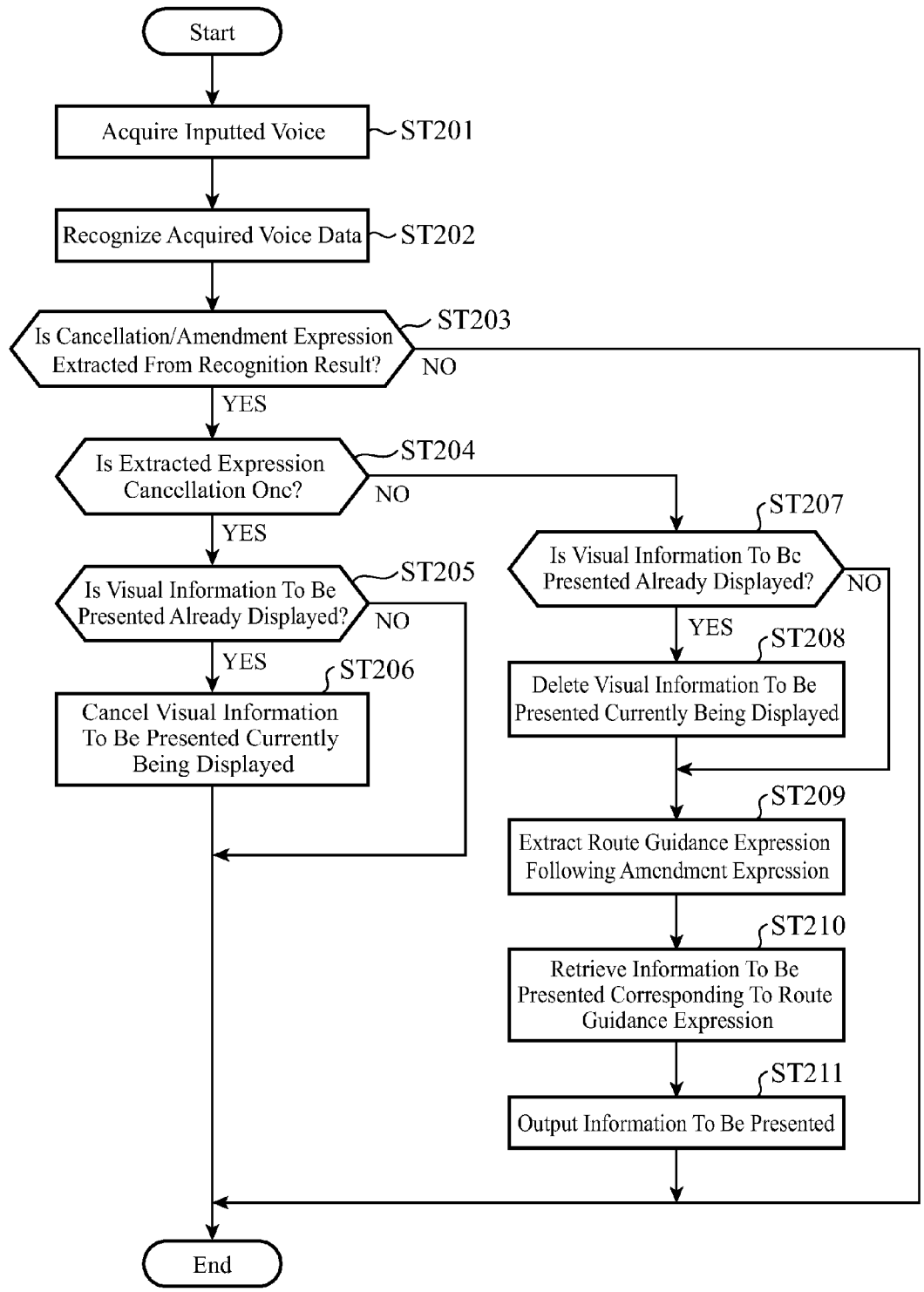
FIG. 26 is a flow chart showing the operation of the navigation device in accordance with Embodiment 10.

FIG. 26 is a flow chart showing the operation of the navigation device in accordance with Embodiment 10. Because processes in steps ST201 and ST202 are the same as those in steps ST01 and ST02 of the flow chart of FIG. 4 shown in Embodiment 1, the explanation of the processes will be omitted hereafter. In this Embodiment 10, a route guidance expression extractor extracts route guidance expressions from the result of recognition by the voice recognizer 2 in step ST202 by referring to the route guidance expression storage 3, while the cancellation/amendment expression extractor 17 extracts a cancellation/amendment expression from the recognition result by referring to the cancellation/amendment expression storage 16. In this case, when no cancellation/amendment expression is extracted by the cancellation/amendment expression extractor 17 (when NO in step ST203), the navigation device ends the processing shown in this flow chart, and the route guidance expression extractor 4 carries out a process of extracting and presenting route guidance expressions (not illustrated and explained hereafter), like those in accordance with Embodiments 1 to 9.

Then, when a cancellation or amendment expression, which is stored in the cancellation/amendment expression storage 16, is extracted by the cancellation/amendment expression extractor 17 (when YES in step ST203) and the extracted cancellation or amendment expression is, for example, a cancellation expression "I've made a mistake" (when YES in step ST204), and information to be presented is visual information to be presented, the cancellation amendment expression extractor 17 notifies a presentation controller 10 that the display of the visual information to be presented is cancelled. More specifically, when visual information to be presented is already displayed (when YES in step ST205), the presentation controller 10 stops displaying the visual information to be presented (step ST206). Further, when visual information to be presented has not been displayed yet (when NO in step ST205), the navigation device ends the processing without displaying anything.

In contrast, when the expression extracted by the cancellation/amendment expression extractor 17 is not a cancellation expression but an amendment expression such as "scratch that" (when NO in step ST204), and visual information to be presented is already displayed (when YES in step ST207), the presentation controller 10 stops displaying the visual information to be presented (step ST208). Further, when no visual information to be presented has been displayed yet (when NO in step ST207), the navigation device then carries out a process in step ST209. In step ST209, the cancellation/amendment expression extractor 17 extracts a route guidance expression following the amendment expression by referring to the route guidance expression storage 3 (step ST209). A route guidance expression information to be presented retriever 9 then retrieves corresponding information to be presented on the basis of the route guidance expression (step ST210), and a presentation control outputter 20 outputs the information to be presented (step ST211).

A concrete example will be explained hereafter. For example, when a fellow passenger says "I've made a mistake" after saying "Turn right at the next intersection", a voice acquirer 1 acquires voice data about the utterance (step ST201) and a voice recognizer 2 acquires the results of recognition of "turn right at the next intersection" and "I've made a mistake" (step ST202). In this case, the cancellation/amendment expression extractor 17 extracts the character string "I've made a mistake" as a cancellation expression by referring to the cancellation/amendment expression storage 16. More specifically, because a cancellation or amendment expression is extracted from the voice recognition result (when YES in step ST203) and the extracted expression is a cancellation one (when YES in step ST204), the navigation device stops the display of the visual information to be presented (step ST206) when visual information to be presented showing "turn right" is already displayed (when YES in step ST205). Further, when no visual information to be presented has been displayed yet (when NO in step ST205), the navigation device ends the processing without displaying anything.

Figure 27:
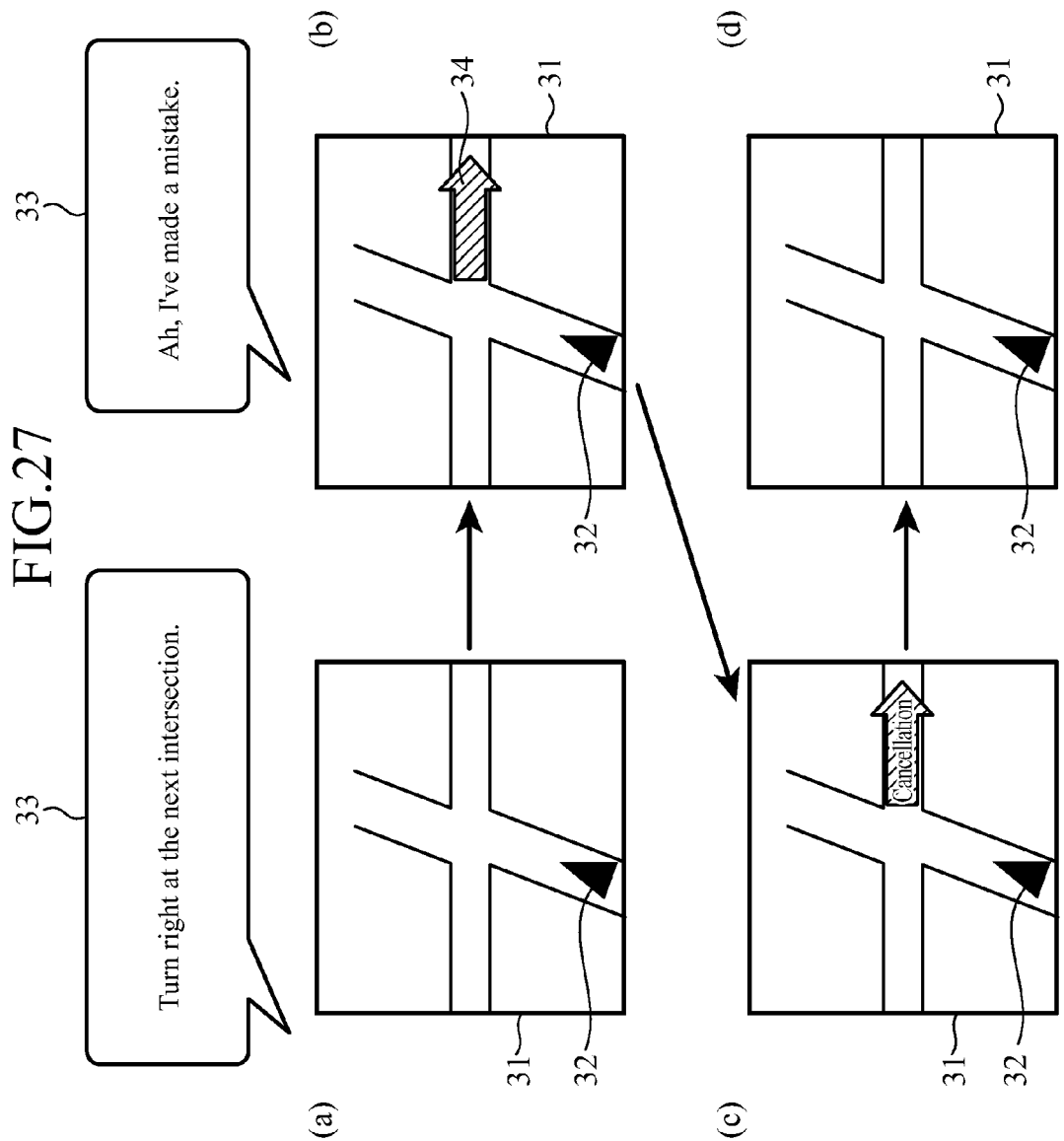
FIG. 27 is a diagram showing an example of a screen transition when an cancellation expression is extracted in Embodiment 10.

FIG. 27 is a diagram showing an example of a screen transition when a cancellation expression is extracted. FIG. 27(*a*) shows a display screen on which a triangle showing a vehicle 32 is displayed in a navigation screen 31 and a state in which a fellow passenger says "Turn right at the next intersection", and the content of the utterance is shown in a balloon 33. FIG. 27(*b*) shows a state in which, as a result of the navigation device carrying out a process of outputting information to be presented explained in Embodiment 2 in the above-mentioned state, "graphic data about a right arrow" 34 is displayed, as visual information to be presented, on the road through which the vehicle will pass after turning right in the same navigation screen 31 as that shown in FIG. 27(*a*), and a state in which the fellow passenger says "I've made a mistake" in that state. The content of this utterance is also shown in a balloon 33. As a result, processes in steps ST204 to ST206, among processes of the above-mentioned flow chart shown in FIG. 26, are carried out and the display of the "graphic data about a right arrow" 34 is canceled (refer to FIG. 27(*c*)), and the navigation screen is placed in such a state as shown in FIG. 27 (*d*). In addition, when the content of an utterance made by a fellow passenger is a series of utterances "Turn right at the next intersection. Ah, I've made a mistake", and a cancellation expression "I've made a mistake" is extracted before such visual information to be presented as shown in FIG. 27 (*b*) is displayed, the navigation device ends the processing without displaying anything. More specifically, the navigation device makes a transition from the state of FIG. 27(*a*) directly to the state of FIG. 27(*d*), and does not change anything in terms of the display.

Further, for example, when a fellow passenger utters "Turn right at the next intersection. Scratch that! Turn left!", the cancellation/amendment expression extractor 17 extracts an amendment expression "scratch that." More specifically, because NO in step ST204 in this case, the cancellation/amendment expression extractor further extracts "turn left" following the "scratch that" as a route guidance expression by referring to the route guidance expression storage 3 (step ST209). The navigation device then retrieves information to be presented corresponding to the "turn left" by referring to a route guidance expression information to be presented storage 8 (step ST210), and generates a display or voice output (step ST211).

FIG. 28 is a diagram showing an example of a screen transition when an amendment expression is extracted. FIG. 28(*a*) shows a display screen on which a triangle showing the vehicle 32 is displayed in a navigation screen 31 and a state in which a fellow passenger says "Turn right at the next intersection. Scratch that! Turn left!", and the content of the utterance is shown in a balloon 33. FIG. 28(*b*) shows a state in which, as a result of the navigation device carrying out a process of outputting information to be presented explained in Embodiment 2 in the above-mentioned state, "graphic data about a right arrow" 34 is displayed, as visual information to be presented, on the road through which the vehicle will pass after turning right in the same navigation screen 31 as that shown in FIG. 28(*a*). However, because the amendment expression "scratch that" is included in the content of the utterance, this amendment expression is extracted and, as a result, the processes in steps ST204 and ST207 to ST208, among the processes of the above-mentioned flowchart shown in FIG. 26, are carried out and the display of the "graphic data about a right arrow" 34 is deleted (refer to FIG. 28(*c*)). In addition, "turn left" following "scratch that" is extracted as a route guidance expression, and, as a result, the processes in steps ST209 to ST211 of the flow chart shown in FIG. 26 are carried out and "graphic data about a left arrow" 34 corresponding to "turn left" is displayed as shown in FIG. 28(*d*). When the amendment expression "scratch that" is extracted before visual information to be presented as shown in FIG. 28(*b*) is displayed, the navigation device makes a transition from the state of FIG. 28(*a*) directly to the state of FIG. 28(*d*).

Also in this embodiment, although the navigation device in accordance with this embodiment always recognizes the content of a fellow passenger's utterance, the navigation device can be alternatively constructed in such a way as to carry out voice recognition only during a predetermined time period (e.g., during a time period during which a fellow passenger is pressing a button for causing the navigation device to carry out voice recognition after starting providing route guidance for the driver). Further, the user is enabled to set whether the navigation device always carries out voice recognition or carries out voice recognition only during a predetermined time period. In addition, although the case in which when visual information to be presented which should be canceled is already displayed, the visual information is canceled (deleted) is explained in this Embodiment 10, the user is enabled to set whether to cancel the visual information to be presented currently being displayed or display, as well as this information to be presented, visual information to be presented showing that the former information is cancelled. Further, the user is enabled to set whether or not to use the function of extracting a cancellation/amendment expression in accordance with this Embodiment 10.

As mentioned above, because when a cancellation/amendment expression is included in route guidance expressions which are uttered by a speaking person, such as a fellow passenger, the navigation device in accordance with this Embodiment 10 also extracts cancellation/amendment expression, in addition to the advantages provided by Embodiment 1, the navigation device can prevent the driver from travelling along a wrong route by understanding route guidance which is erroneously provided by a speaking person, such as a fellow passenger, and then cancelling or amending visual information to be presented which should be canceled.

Although the example in which the navigation device in accordance with Embodiment 1 further includes the cancellation/amendment expression storage 16 and the cancellation/amendment expression extractor 17 is explained in above-mentioned Embodiment 10, it is needless to say that the navigation device in accordance with Embodiment 2 can further include the cancellation/amendment expression storage 16 and the cancellation/amendment expression extractor 17.

Although the navigation device for vehicles is explained in the embodiments of the present invention, the navigation device in accordance with the present invention is used not only for vehicles, but also for moving objects including persons, vehicles, railroads, ships, and airplanes. Particularly, the present invention relates to a navigation device suitable for being carried onto or mounted to a vehicle, and can be applied to any type of device, such as a portable navigation device, as long as the device can carry out navigation through interactions between the user and the device.

While the invention has been described in its preferred embodiments, it is to be understood that an arbitrary combination of two or more of the above-mentioned embodiments can be made, various changes can be made in an arbitrary component in accordance with any one of the above-mentioned embodiments, and an arbitrary component in accordance with any one of the above-mentioned embodiments can be omitted within the scope of the invention.

INDUSTRIAL APPLICABILITY

The navigation device in accordance with the present invention can be applied to a vehicle-mounted navigation device and a portable navigation device that can carry out navigation through interactions between the user and the device.

EXPLANATIONS OF REFERENCE NUMERALS 1 voice acquirer, 2 voice recognizer, 3 route guidance expression storage, 4 route guidance expression extractor, 5 map data storage, 6 vehicle position acquirer (position acquirer), 7 route guidance expression interpreter, 8 route guidance expression information to be presented storage, 9 route guidance expression information to be presented retriever, 10 presentation controller, 11 external object recognizer, 12 gesture recognizer, 13 contradiction determinator, 14 route guidance expression appropriateness determinator, 15 route resetter, 16 cancellation/amendment expression storage, 17 cancellation/amendment expression extractor, 20 presentation control outputter, 21 display, 22 voice outputter, 31 navigation screen, 32 vehicle mark, 33 balloon, 34 graphic data, 35 intersection name, 36 red-colored road, 37 road with large road width.

The invention claimed is:

1. A navigation device that includes a voice acquirer that acquires an inputted voice, a voice recognizer that carries out a voice recognition process on voice data acquired by said voice acquirer, and a position acquirer that acquires a position of a moving object, said navigation device providing route guidance on a basis of a result of the recognition by said voice recognizer, the position of the moving object which is acquired by said position acquirer, and map data, said navigation device comprising:
a route guidance expression storage that stores route guidance expressions;
a route guidance expression extractor that refers to said route guidance expression storage to extract a route guidance expression from the result of the recognition by said voice recognizer;
a route guidance expression interpreter that interprets the route guidance expression extracted by said route guidance expression extractor to determine a concrete route guidance expression including a travelling direction, wherein the concrete route guidance expression does not include a destination;
a route guidance expression information to be presented storage that stores visual information to be presented corresponding to said concrete route guidance expression while bringing the visual information to be presented into correspondence with said concrete route guidance expression;
a route guidance expression information to be presented retriever that refers to said route guidance expression information to be presented storage to retrieve the corresponding visual information to be presented as a real-time visual representation of the concrete route guidance expression determined by said route guidance expression interpreter; and
a presentation control outputter that outputs the visual information to be presented retrieved by said route guidance expression information to be presented retriever,
wherein the real-time visual representation includes graphical data of an arrow or a pointer which points in the travelling direction included in the concrete route guidance expression.

2. The navigation device according to claim 1, wherein said route guidance expression interpreter interprets the route guidance expression extracted by said route guidance expression extractor on a basis of both the position of said moving object and said map data to determine the concrete route guidance expression.

3. The navigation device according to claim 1, wherein said navigation device further includes a gesture recognizer that recognizes a gesture, and said route guidance expression interpreter interprets the route guidance expression extracted by said route guidance expression extractor on a basis of a result of the recognition by said gesture recognizer to determine the concrete route guidance expression.

4. The navigation device according to claim 3, wherein said navigation device further includes a contradiction determinator that determines whether or not there is a contradiction between the route guidance expression extracted by said route guidance expression extractor and the recognition result obtained by said gesture recognizer, and, when said contradiction determinator determines that there is a contradiction between them, said route guidance expression interpreter selects either one of the route guidance expression extracted by said route guidance expression extractor and the recognition result obtained by said gesture recognizer according to a predetermined rule to determine said concrete route guidance expression.

5. The navigation device according to claim 4, wherein when said contradiction determinator determines that there is a contradiction between the route guidance expression and the recognition result, said route guidance expression interpreter selects the recognition result obtained by said gesture recognizer to determine said concrete route guidance expression.

6. The navigation device according to claim 4, wherein when said contradiction determinator determines that there is a contradiction between the route guidance expression and the recognition result and a route to a destination is set, said route guidance expression interpreter selects one matching said set route from the route guidance expression extracted by said route guidance expression extractor and the recognition result obtained by said gesture recognizer to determine said concrete route guidance expression.

7. The navigation device according to claim 1, wherein said presentation control outputter outputs the visual information to be presented retrieved by said route guidance expression information to be presented retriever on a basis of a result of the interpretation by said route guidance expression interpreter.

8. The navigation device according to claim 1, wherein said route guidance expression interpreter interprets the route guidance expression extracted by said route guidance expression extractor to also determine a position where said visual information to be presented is to be presented, and said presentation control outputter displays said visual information to be presented at the position determined by said route guidance expression interpreter.

9. The navigation device according to claim 8, wherein when a route to a destination is set, said route guidance expression interpreter determines the position where said visual information to be presented is to be presented on a basis of information about said set route.

10. The navigation device according to claim 8, wherein said navigation device further includes an external object recognizer that recognizes a surrounding object, and said route guidance expression interpreter determines the position where said visual information to be presented is to be presented on a basis of a result of the recognition by said external object recognizer.

11. The navigation device according to claim 1, wherein said navigation device further includes a route guidance expression appropriateness determinator that determines whether or not the concrete route guidance expression determined by said route guidance expression interpreter is appropriate, and said presentation control outputter does not output said visual information to be presented when said route guidance expression appropriateness determinator determines that said concrete route guidance expression is not appropriate.

12. The navigation device according to claim 11, wherein said navigation device further includes a route resetter that resets a route when said route guidance expression appropriateness determinator determines that said concrete route guidance expression is not appropriate.

13. The navigation device according to claim 1, wherein said navigation device further includes a route guidance expression appropriateness determinator that determines whether or not the concrete route guidance expression determined by said route guidance expression interpreter is appropriate, and said presentation control outputter outputs visual information to be presented showing that said route guidance expression is not appropriate when said route guidance expression appropriateness determinator determines that said concrete route guidance expression is not appropriate.

14. The navigation device according to claim 1, wherein said navigation device further includes a cancellation/amendment expression storage that stores expressions used at a time of a cancellation or amendment, and a cancellation/amendment expression extractor that refers to said cancellation/amendment expression storage to extract an expression used for a cancellation or amendment from the result of the recognition by said voice recognizer, and wherein said presentation control outputter does not output said visual information to be presented when said cancellation or amendment expression is extracted.

15. The navigation device according to claim 1, wherein said navigation device further includes a cancellation/amendment expression storage that stores expressions used at a time of a cancellation or amendment, and a cancellation/amendment expression extractor that refers to said cancellation/amendment expression storage to extract an expression used for a cancellation or amendment from the result of the recognition by said voice recognizer, and wherein said presentation control outputter cancels the output of said visual information to be presented when said cancellation or amendment expression is extracted in a state in which said visual information to be presented is outputted.

16. The navigation device according to claim 1, wherein said navigation device further includes a cancellation/amendment expression storage that stores expression used at a time of a cancellation or amendment, and a cancellation/amendment expression extractor that refers to said cancellation/amendment expression storage to extract an expression used for the cancellation or amendment from the result of the recognition by said voice recognizer, and wherein when said cancellation or amendment expression is extracted, said presentation control outputter outputs visual information to be presented corresponding to a route guidance expression extracted successively after said cancellation or amendment expression.

17. The navigation device according to claim 1, wherein the navigation device carries out recognition of a non-language input, and said route guidance expression interpreter determines the concrete route guidance expression using the recognized non-language input in combination with the interpretation of the extracted route guidance expression.

18. A navigation method that includes acquiring an inputted voice; carrying out a machine-based voice recognition process on data of said acquired voice; acquiring a position of a moving object; and providing route guidance on a basis of a result of the voice recognition process, the acquired position of the moving object, and map data; said method comprising:

storing, in a route guidance expression storage device, route guidance expressions;

referring to said route guidance expression storage device to extract a route guidance expression from the result of the voice recognition process;

interpreting the extracted route guidance expression to determine a concrete route guidance expression including a travelling direction, wherein the concrete route guidance expression does not include a destination;

storing, in a route guidance expression information to be presented storage device, visual information to be presented corresponding to said concrete route guidance expression while bringing the visual information to be presented into correspondence with said concrete route guidance expression;

referring to said route guidance expression information to be presented storage to retrieve the corresponding visual information to be presented as a real-time visual representation of the determined concrete route guidance expression; and outputting the retrieved visual information to be presented, wherein the real-time visual representation includes graphical data of an arrow or a pointer which points in the travelling direction included in the concrete route guidance expression.

19. A non-transitory computer readable medium on which is stored a navigation program that, when executed by a computer, provides route guidance on a basis of a result of recognition by a voice recognizer, a position of a moving object which is acquired by a position acquirer and map data by causing said computer to perform a method including:

acquiring an inputted voice;

carrying out a machine-based voice recognition process on data of said acquired voice;

referring to a route guidance expression storage to extract a route guidance expression from the result of the voice recognition process;

interpreting the extracted route guidance expression to determine a concrete route guidance expression including a travelling direction, wherein the concrete route guidance expression does not include a destination;

storing, in a route guidance expression information to be presented storage, visual information to be presented corresponding to said concrete route guidance expression while bringing the visual information to be presented into correspondence with said concrete route guidance expression;

referring to said route guidance expression information to be presented storage to retrieve the corresponding visual information to be presented as a real-time visual representation of the determined concrete route guidance expression; and outputting the retrieved visual information to be presented, wherein the real-time visual representation includes graphical data of an arrow or a pointer which points in the travelling direction included in the concrete route guidance expression.

* * * * *